United States Patent
Ganguly et al.

(10) Patent No.: US 12,175,754 B2
(45) Date of Patent: *Dec. 24, 2024

(54) SYSTEM AND METHOD FOR CONTENT AND STYLE PREDICTIONS IN SPORTS

(71) Applicant: STATS LLC, Chicago, IL (US)

(72) Inventors: Sujoy Ganguly, Chicago, IL (US); Long Sha, Brisbane (AU); Jennifer Hobbs, Chicago, IL (US); Xinyu Wei, Melbourne (AU); Patrick Joseph Lucey, Chicago, IL (US)

(73) Assignee: Stats LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,145

(22) Filed: Jan. 13, 2023

(65) Prior Publication Data

US 2023/0169766 A1 Jun. 1, 2023

Related U.S. Application Data

(63) Continuation of application No. 16/870,170, filed on May 8, 2020, now Pat. No. 11,554,292.
(Continued)

(51) Int. Cl.
*G06V 20/40* (2022.01)
*A63B 24/00* (2006.01)
(Continued)

(52) U.S. Cl.
CPC .......... *G06V 20/42* (2022.01); *A63B 24/0006* (2013.01); *A63B 24/0021* (2013.01);
(Continued)

(58) Field of Classification Search
CPC ............ A63B 24/0021; A63B 24/0006; A63B 24/0087; A63B 2024/0009; A63B 2024/0025; A63B 2024/0028; G06N 3/08
See application file for complete search history.

(56) References Cited

U.S. PATENT DOCUMENTS

| | | |
|---|---|---|
| 6,616,529 B1 | 9/2003 | Qian et al. |
| 6,710,713 B1 | 3/2004 | Russo |

(Continued)

FOREIGN PATENT DOCUMENTS

| | | |
|---|---|---|
| CN | 1386241 | 12/2002 |
| CN | 1708697 A | 12/2005 |

(Continued)

OTHER PUBLICATIONS

Liang et al., Dual Motion GAN for Future-Flow Embedded Video Prediction, Aug. 3, 2017, pp. 1-9 (year 2017) (Year: 2017).*

(Continued)

*Primary Examiner* — Malina D. Blaise
(74) *Attorney, Agent, or Firm* — Bookoff McAndrews, PLLC

(57) ABSTRACT

A system and method for generating a play prediction for a team is disclosed herein. A computing system retrieves trajectory data for a plurality of plays from a data store. The computing system generates a predictive model using a variational autoencoder and a neural network by generating one or more input data sets, learning, by the variational autoencoder, to generate a plurality of variants for each play of the plurality of plays, and learning, by the neural network, a team style corresponding to each play of the plurality of plays. The computing system receives trajectory data corresponding to a target play. The predictive model generates a likelihood of a target team executing the target play by determining a number of target variants that correspond to a target team identity of the target team.

20 Claims, 10 Drawing Sheets

Related U.S. Application Data

(60) Provisional application No. 62/844,874, filed on May 8, 2019.

(51) Int. Cl.
*G06N 3/08* (2023.01)
*G06V 10/82* (2022.01)

(52) U.S. Cl.
CPC .......... *A63B 24/0087* (2013.01); *G06N 3/08* (2013.01); *G06V 10/82* (2022.01); *A63B 2024/0009* (2013.01); *A63B 2024/0025* (2013.01); *A63B 2024/0028* (2013.01)

(56) References Cited

U.S. PATENT DOCUMENTS

| | | |
|---|---|---|
| 6,751,343 B1 | 6/2004 | Ferrell et al. |
| 9,342,785 B2 | 5/2016 | Lucey et al. |
| 9,442,933 B2 | 9/2016 | Tzoukermann |
| 10,201,752 B2 | 2/2019 | Lucey et al. |
| 10,460,176 B2 | 10/2019 | Chang et al. |
| 11,157,742 B2* | 10/2021 | Zhang .................. G06V 10/764 |
| 11,182,806 B1 | 11/2021 | Arfa et al. |
| 11,232,109 B1 | 1/2022 | Knoll et al. |
| 2002/0165697 A1 | 11/2002 | Min |
| 2004/0148275 A1 | 7/2004 | Achlioptas |
| 2004/0148278 A1 | 7/2004 | Milo et al. |
| 2005/0143198 A1 | 6/2005 | Charge |
| 2006/0083304 A1 | 4/2006 | Pan et al. |
| 2006/0149674 A1 | 7/2006 | Cook et al. |
| 2006/0252476 A1 | 11/2006 | Bahou |
| 2007/0293289 A1 | 12/2007 | Loeb |
| 2008/0281444 A1 | 11/2008 | Krieger et al. |
| 2009/0186679 A1 | 7/2009 | Irvine et al. |
| 2009/0203447 A2 | 8/2009 | Hansen et al. |
| 2010/0129780 A1 | 5/2010 | Homsi et al. |
| 2010/0184495 A1 | 7/2010 | Levy et al. |
| 2010/0184563 A1 | 7/2010 | Molyneux et al. |
| 2010/0283630 A1 | 11/2010 | Alonso |
| 2010/0298958 A1 | 11/2010 | Connelly |
| 2011/0013087 A1 | 1/2011 | House et al. |
| 2011/0169959 A1 | 7/2011 | DeAngelis et al. |
| 2011/0173235 A1 | 7/2011 | Aman et al. |
| 2011/0267461 A1 | 11/2011 | Birenboim et al. |
| 2012/0162435 A1 | 6/2012 | Elangovan et al. |
| 2012/0214602 A1 | 8/2012 | Ahlstrom |
| 2013/0104870 A1 | 5/2013 | Rizzo et al. |
| 2013/0110271 A1 | 5/2013 | Fornell et al. |
| 2013/0225271 A1 | 8/2013 | Amaitis |
| 2013/0238106 A1 | 9/2013 | Ellis et al. |
| 2013/0267328 A1 | 10/2013 | Heisler et al. |
| 2014/0142921 A1 | 5/2014 | Gleadall et al. |
| 2014/0143183 A1 | 5/2014 | Sigal et al. |
| 2014/0206479 A1 | 7/2014 | Marty et al. |
| 2014/0236331 A1 | 8/2014 | Lehmann et al. |
| 2014/0274245 A1 | 9/2014 | Stickel |
| 2014/0302914 A1 | 10/2014 | Weinstein et al. |
| 2014/0309000 A1 | 10/2014 | Gustafson |
| 2014/0364976 A1 | 12/2014 | Wohl et al. |
| 2015/0031845 A1 | 1/2015 | McCauley et al. |
| 2015/0058730 A1 | 2/2015 | Dubin et al. |
| 2015/0131845 A1* | 5/2015 | Forouhar .................. G06V 20/44 |
| | | 382/100 |
| 2015/0142716 A1 | 5/2015 | Lucey et al. |
| 2015/0148129 A1 | 5/2015 | Austerlade et al. |
| 2015/0248917 A1 | 9/2015 | Chang et al. |
| 2015/0258416 A1* | 9/2015 | Ianni .................. G06V 40/23 |
| | | 700/91 |
| 2015/0360134 A1 | 12/2015 | Rodriguez |
| 2016/0007054 A1 | 1/2016 | Polumbus et al. |
| 2016/0096071 A1* | 4/2016 | Ianni .................. A63B 71/0605 |
| | | 700/91 |
| 2016/0182415 A1 | 6/2016 | Ames et al. |
| 2016/0203279 A1 | 7/2016 | Srinivas et al. |
| 2016/0220878 A1 | 8/2016 | Devathi |
| 2016/0260015 A1 | 9/2016 | Lucey et al. |
| 2016/0375365 A1 | 12/2016 | Thompson et al. |
| 2017/0043260 A1 | 2/2017 | Austerlade et al. |
| 2017/0061314 A1 | 3/2017 | Schnurr et al. |
| 2017/0072321 A1 | 3/2017 | Thompson et al. |
| 2017/0080336 A1 | 3/2017 | Groset et al. |
| 2017/0109015 A1 | 4/2017 | Krasadakis |
| 2017/0132821 A1 | 5/2017 | Valliani et al. |
| 2017/0165570 A1 | 6/2017 | Lucey et al. |
| 2017/0166557 A1 | 6/2017 | Lucey et al. |
| 2017/0235848 A1 | 8/2017 | Van Dusen et al. |
| 2017/0238055 A1 | 8/2017 | Chang et al. |
| 2017/0246539 A1 | 8/2017 | Schwartz et al. |
| 2017/0255830 A1 | 9/2017 | Chen |
| 2017/0257653 A1 | 9/2017 | Farre et al. |
| 2017/0259178 A1 | 9/2017 | Aghdaie et al. |
| 2017/0291093 A1 | 10/2017 | Janssen |
| 2017/0330029 A1 | 11/2017 | Turcot et al. |
| 2018/0032858 A1* | 2/2018 | Lucey .................. G06N 3/08 |
| 2018/0056124 A1* | 3/2018 | Marty .................. A63B 69/0071 |
| 2018/0084310 A1 | 3/2018 | Katz et al. |
| 2018/0099201 A1* | 4/2018 | Marty .................. G06V 40/23 |
| 2018/0137364 A1 | 5/2018 | Forouhar et al. |
| 2018/0157974 A1 | 6/2018 | Carr et al. |
| 2018/0158196 A1 | 6/2018 | Marks |
| 2018/0204111 A1* | 7/2018 | Zadeh .................. G06V 10/764 |
| 2018/0213033 A1* | 7/2018 | Subbian .................. H04L 67/306 |
| 2018/0218243 A1 | 8/2018 | Felsen et al. |
| 2019/0087661 A1* | 3/2019 | Lee .................. G06V 10/82 |
| 2019/0205652 A1 | 7/2019 | Ray et al. |
| 2019/0221072 A1 | 7/2019 | Litman |
| 2019/0224556 A1 | 7/2019 | Ruiz et al. |
| 2019/0228290 A1 | 7/2019 | Ruiz et al. |
| 2019/0228306 A1 | 7/2019 | Power et al. |
| 2019/0251366 A1 | 8/2019 | Zhong et al. |
| 2019/0374839 A1 | 12/2019 | Wanke et al. |
| 2020/0004752 A1 | 1/2020 | Majumdar et al. |
| 2020/0043287 A1 | 2/2020 | Zhang et al. |
| 2020/0074181 A1 | 3/2020 | Chang et al. |
| 2020/0170549 A1* | 6/2020 | Baykaner .................. G16H 10/60 |
| 2020/0218902 A1 | 7/2020 | Chang et al. |
| 2020/0230501 A1 | 7/2020 | Schwartz et al. |
| 2020/0302181 A1 | 9/2020 | Bhanu et al. |
| 2020/0336802 A1 | 10/2020 | Russell et al. |
| 2020/0349611 A1 | 11/2020 | Publicover et al. |
| 2020/0353311 A1 | 11/2020 | Ganguly et al. |
| 2021/0056458 A1 | 2/2021 | Savova et al. |
| 2021/0134124 A1 | 5/2021 | Srinivasan |
| 2021/0142066 A1 | 5/2021 | Jayaram et al. |
| 2021/0256265 A1 | 8/2021 | Gurpinar-Morgan et al. |
| 2021/0272599 A1 | 9/2021 | Patterson et al. |
| 2021/0304375 A1* | 9/2021 | Kothari .................. G06N 3/08 |
| 2021/0383123 A1 | 12/2021 | Hobbs et al. |
| 2021/0397846 A1 | 12/2021 | Chang et al. |
| 2022/0055689 A1* | 2/2022 | Mandlekar .................. B60W 60/0025 |
| 2022/0067983 A1* | 3/2022 | Fidler .................. G06V 20/58 |
| 2022/0253679 A1 | 8/2022 | Power et al. |
| 2022/0270004 A1 | 8/2022 | Ruiz et al. |
| 2022/0284311 A1 | 9/2022 | Haynes et al. |

FOREIGN PATENT DOCUMENTS

| | | |
|---|---|---|
| CN | 102819749 A | 12/2012 |
| CN | 105833502 | 8/2016 |
| KR | 10-0986647 | 10/2010 |
| WO | 0122270 A2 | 3/2001 |
| WO | 2013166456 A2 | 11/2013 |
| WO | 2014/008134 | 1/2014 |
| WO | 2015/076682 | 5/2015 |
| WO | 2017/031356 | 2/2017 |
| WO | 2017/161167 | 9/2017 |
| WO | 2020/010040 | 1/2020 |

OTHER PUBLICATIONS

Al-Shboul, et al., "Automated Player Selection for Sports Team using Competitive Neural Networks", International Journal of Advanced

(56) References Cited

OTHER PUBLICATIONS

Computer Science and Applications (IJACSA), vol. 8, No. 8, 2017, pp. 457-460.
International Search Report and Written Opinion for PCT Application No. PCT/US2019/014609, dated Apr. 12, 2019, 10 pages.
International Search Report and Written Opinion for PCT Application No. PCT/US2019/014613, dated Apr. 12, 2019, 9 pages.
Yue, et al., "Learning Fine-Grained Spatial Models for Dynamic Sports Play Prediction", ICDM, 2014, 10 pages.
International Search Report and Written Opinion for PCT Application No. PCT/US2016/066733, dated Apr. 17, 2017, 11 pages.
Sha, et al., "Chalkboarding: A New Spatiotemporal Query Paradigm for Sports Play Retrieval", IUI, 2016, 12 pages.
Cox, et al., "Least Squares Congealing for Unsupervised Alignment of Images", CVPR, 2008, 8 pages.
Hinton, et al. "A Fast Learning Algorithm for Deep Belief Nets", Neural Comput, 18(7), 2006, pp. 1527-1554.
Peng, et al., "RASL: Robust Alignment by Sparse and Low-rank Decomposition for Linearly Correlated Images", PAMI, vol. 34, No. 11, 2012, 8 pages.
Miller, et al., "Factorized Point Process Intensities: A Spatial Analysis of Professional Basketball", ICML, Jan. 8, 2014, 13 pages.
Trainor, "Goalkeepers: How repeatable are shot saving performances?", Statsbomb, https://statsbomb.com/2014/10/goalkeepers-how-repeatable-are-shot-saving-performances/, Oct. 21, 2014.
Newton, "How Youtub Perfected The Feed", The Verge, https://www.theverge.com/2017/8/30/16222850/youtube-google-brain-algorithm-video-recommendation-personalized-feed, Aug. 30, 2017.
Covington, et al., "Deep neural networks for youtube recommendations", Proceedings of the 10th ACM conference on recommender systems, pp. 191-198, Sep. 2016.
Cheng, et al., "Wide & deep learning for recommender systems", Proceedings of the 1st workshop on deep learning for recommender systems, Sep. 2016.
Alcorn, "(batter|pitcher) 2vec: statistic-free talent modeling with neural player embeddings", MIT Sloan Sports Analytics Conference, 2018.
Wei, et al., "The thin edge of the wedge: Accurately predicting shot outcomes in tennis using style and context priors", Proceedings of the 10th Annual MIT Sloan Sport Anal Conference, Mar. 2016.
Seidl, et al., "Bhostgusters: Realtime interactive play sketching with synthesized NBA defenses", Proceeding of the 12th MIT Sloan Sports Analytics Conference, 2018.
Maaten, et al., "Visualizing data using t-SNE", Journal of machine learning research Sep. 2008, pp. 2579-2605, Nov. 2008.
Felsen, et al., "Body shots: Analyzing shooting styles in the NBA using body pose", MIT Sloan, Sports Analytics Conference, Mar. 2017.
CD160 isoforms and regulation of CD4 and CD8 T-cell responses, Authors: Mohamed El-Far, Charles Pellerin, Louise Pilote, Jean-Francois Fortin, Ivan A D Lessard, Yoav Peretz, Elizabeth Wardrop, Patrick Salois, Richard C Bethell, Michael G Cordingley, George Kukolj, Publication data: Journal of Translational Medicine,,Sep. 2, 2014,BioMed Central, Source info: vol. 12, Nr: 1, pp. 217.
Extended European Search Report for European Application No. 16876628.5, mailed Jan. 29, 2020, 17 Pages.
Extended European Search Report for European Application No. 19740811.5, mailed Sep. 21, 2021, 10 Pages.
Extended European Search Report for European Application No. 19741311.5, mailed Sep. 15, 2021, 09 Pages.
Extended European Search Report for European Application No. 19741603.5, mailed Jun. 2, 2022, 11 Pages.
Extended European Search Report for European Application No. 19741793.4, mailed Jun. 28, 2022, 10 Pages.
Extended European Search Report for European Application No. 20765556.4, mailed Oct. 7, 2022, 12 Pages.
International Preliminary Report on Patentability for International Application No. PCT/US2016/066733, mailed Jun. 28, 2018, 9 Pages.
International Preliminary Report on Patentability for International Application No. PCT/US2019/014608, mailed Jul. 30, 2020, 10 Pages.
International Preliminary Report on Patentability for International Application No. PCT/US2019/014609, mailed Jul. 30, 2020, 08 Pages.
International Preliminary Report on Patentability for International Application No. PCT/US2019/014613, mailed Jul. 30, 2020, 07 Pages.
International Preliminary Report on Patentability for International Application No. PCT/US2019/014614, mailed Jul. 30, 2020, 6 Pages.
International Preliminary Report on Patentability for International Application No. PCT/US2020/020432, mailed Sep. 16, 2021, 10 Pages.
International Preliminary Report on Patentability for International Application No. PCT/US2020/032053, mailed Nov. 18, 2021, 08 Pages.
International Preliminary Report on Patentability for International Application No. PCT/US2021/016583, mailed Aug. 18, 2022, 11 Pages.
International Preliminary Report on Patentability for International Application No. PCT/US2021/034568 , mailed Dec. 15, 2022, 8 Pages.
International Search Report and Written Opinion for International Application No. PCT/US2020/020432, mailed May 28, 2020, 11 Pages.
International Search Report and Written Opinion for International Application No. PCT/US2020/032053, mailed Sep. 29, 2020, 09 Pages.
Partial Supplementary European Search Report for European Application No. 16876628.5, mailed Aug. 14, 2019, 16 Pages.
The $CD160^+ + CD8^+h^+i^+g^+h$ cytotoxic T cell subset correlates with response to HAART in HIV-1+ patients, Authors: Nikolova, Muhtarova M H, Taskov M N, Kostov H B, Vezenkov K, Mihova L, Boumsell A, Bensussan L, A, Publication data: Cellular Immunology,,Oct. 1, 2005,Academic Press, San Diego, CA, US, Source info: vol. 237, Nr: 2, pp. 96-105.
Wei X., et al., "Large-Scale Analysis of Formations in Soccer," Proceedings of the Digital Image Computing: Technqiues and Applications (DICTA), IEEE, Nov. 26, 2013, pp. 1-8, XP032536466, DOI: 10.1109/DICTA.2013.6691503.
Wei X., et al., "Predicting Serves in Tennis Using Style Priors," Proceedings of the 21th ACM SIGKDD International Conference on Knowledge Discovery and Data Mining, 2015, 9 pages.
PCT International Application No. PCT/US22/77383, International Search Report and Written Opinion of the International Searching Authority, dated Dec. 13, 2022, 15 pages.
PCT International Application No. PCT/US22/76934, International Search Report and Written Opinion of the International Searching Authority, dated Dec. 13, 2022, 10 pages.
ESPN Staff, "Neymar from Barca to PSG for €222m: Timeline of the world's biggest transfer", ESPN, http://www.espn.com/soccer/blog/soccer-transfers/613/post/3170513/neymar-from-barcelona-to-psg-for-222m-euros-timeline-as-worlds-biggest-transfer-nears, Aug. 4, 2017, 18 pages.
Pulling, "Long Corner Kicks In The English Premier League: Deliveries Into The Goal Ara And Critical Area", Kinesiology: International journal of fundamental and applied kinesiology 47.2, 2015, pp. 193-201.
Casal, et al., "Analysis of Corner Kick Success in Elite Football", International Journal of Performance Analysis in Sport 2015, pp. 430-451.
Bialkowski, et al., "Large-Scale Analysis of Soccer Matches using Spatiotemporal Tracking Data", IEEE International Conference on Data Mining, 2014, 6 pages.
Lucey, et al., "Quality vs Quantity: Improved Shot Prediction in Soccer using Strategic Features from Spatiotemporal Data", 9th Annual MIT Sloan Sports Analytics Conference, Feb. 27-28, 2015, 9 pages.
Le, et al., "Data-Driven Ghosting using Deep Imitation Learning", MIT Sloan Sports Analytics Conference, Mar. 3-4, 2017, 15 pages.

(56) References Cited

OTHER PUBLICATIONS

Cervone, et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.

Ross, et al., "Shortcomings in the attribution process: On the origins and maintenance of erroneous social assessments", Cambridge University Press, 1982, pp. 129-152.

Wright, "Liverpool's set-piece problem exposed in 3-3 draw with Watford", https://www.skysports.com/football/news/15117/10985307/liverpools-set-piece-problem-exposed-in-3-3-draw-with-watford, Dec. 8, 2017, 9 pages.

Walters, "Virgil van Dijk transfer may not fix Liverpool's dismal defending of set-pieces warns Jurgen Klopp after Watford woe", https://www.mirror.co.uk/sport/football/news/liverpool-klopp-van-dijk-setpiece-10981217, Aug. 13, 2017, 21 pages.

Frey, et al., "Clustering by Passing Messages Between Data Points" Science Magazine, Feb. 15, 2007, 23 pages.

Anderson, et al., "The Numbers Game: Why Everything You Know About Soccer is Wrong", 2013, Penguin Books.

Srinivas, et al., "A taxonomy of deep convolutional neural nets for computer vision," Frontiers in Robotics and AI 2, Jan. 11, 2016, 13 pages.

Dertat, et al., "Applied deep learning—part 4: Convolutional neural networks," Towards Data Science 26, https://towardsdatascience.com/applied-deep-learning-part-4-convolutional-neural-networks-584bc134c1e2, Nov. 8, 2017, 26 pages.

Edge AI and Vision Alliance, "Using Cconvolutional Neural Networks fo Image Recognition," https://www.edge-ai-vision.com/2015/11/using-convolutional-neural-networks-for-image-recognition/, Nov. 12, 2015, 20 pages.

Machine Learning Notebook, "Convolutional Neural Networks—Basics," https://mlnotebook.github.io/post/CNN1/, Apr. 7, 2017, 13 pages.

Knauf, et al., "Spatio-temporal convolution kernels," Machine learning 102.2, Jul. 2015, 28 pages.

Chandler, et al., "An exploratory study of minor league baseball statistics," Journal of Quantitative Analysis in Sports 8.4, 2012, 37 pages.

Perricone, et al., "Predicting Results for Professional Basketball Using NBA API Data," 2016, 6 pages.

Kinoshita, et al., "Deep mixture density network for statistical model-based feature enhancement," 2017 IEEE International Conference on Acoustics, Speech and Signal Processing (ICASSP), Mar. 2017, pp. 251-255.

Wang, et al., "Classifying NBA offensive plays using neural networks," Proceedings of MIT Sloan Sports Analytics Conference, vol. 4, 2016, 9 pages.

Zhao, "Research and Application of Online Learning of Formation Strategy Based on Neural Network Information Technology Collection of China Masters' Dissertations Full Text Database," No. 2, 2014, pp. 38-40.

Liang, et al., "Dual motion GAN for future-flow embedded video prediction," proceedings of the IEEE international conference on computer vision, 2017, 9 pages.

Mehrotra, "Elements of artifical neural networks," MIT Press, 1997.

Arabzad, et al., "Football match results prediction using artificial neural networks; the case of Iran Pro League," Journal of Applied Research on Industrial Engineering 1.3, Oct. 9, 2014, pp. 159-179.

PCT International Application No. PCT/US19/14614, International Search Report and Written Opinion of the International Searching Authority, dated Apr. 16, 2019, 9 pages.

PCT International Application No. PCT/US19/14608, International Search Report and Written Opinion of the International Searching Authority, dated Apr. 15, 2019, 12 pages.

PCT International Application No. PCT/US21/16583, International Search Report and Written Opinion of the International Searching Authority, dated Apr. 23, 2021, 11 pages.

Acuna, "Unsupervised modeling of the movement of basketball players using a deep generative model," 31st Conference on Neural Information Processing Systems, 2017, 11 pages.

Felsen, et al., "Where will they go? predicting fine-grained adversarial multi-agent motion using conditional variational autoencoders," Proceedings of the European conference on computer vision (ECCV), 2018, pp. 761-776.

Nakashima, et al., "Off-line learning of soccer formations from game logs," 2010 World Automation Congress, 2010, 6 pages.

Janetzko, et al., "Feature-driven visual analytics of soccer data," 2014 IEEE conference on visual analytics science and technology (VAST), Nov. 2014, pp. 13-22.

Wagenaar, "Predicting Goal-Scoring Opportunities in Soccer by Using Deep Convolutional Neural Networks," Department of Artificial Intelligence, University of Groningen, Nov. 16, 2016, 65 pages.

Abreu, et al., "Improving a simulated soccer team's performance through a Memory-Based Collaborative Filtering approach," Applied Soft Computing 23, 2014, pp. 180-193.

McCabe, et al., "Artificial intelligence in sports prediction," Fifth International Conference on Information Technology: New Generations, IEEE Computer Society, Apr. 9, 2008, 4 pages.

Abdullah, et al., "Intelligent prediction of soccer technical skill on youth soccer player's relative performance using multivariate analysis and artificial neural network techniques," International Journal on Advanced Science, Engineering and Information Technology 6.5, Dec. 2016, pp. 668-674.

Preferred Networks, Inc., "Football Analytics using Deep Learning," YouTube, https://www.youtube.com/watch?v=hs_v3dv6OUI, Jul. 25, 2019, 3 pages.

Power, et al., "Not all passes are created equal: Objectively measuring the risk and reward of passes in soccer from tracking data," Proceedings of the 23rd ACM SIGKDD international conference on knowledge discovery and data mining, Aug. 2017, pp. 1605-1613.

Cervone, et al., "A multiresolution stochastic process model for predicting basketball possession outcomes," Journal of the American Statistical Association 111.514, 2016, pp. 585-599.

Ruiz, et al., "The Leicester City Fairytale?" Utilizing New Soccer Analytics Tools to Compare Performance in the 2015/2016 & 2016/2017 EPL Seasons, Proceedings of the 23rd ACM SIGKDD International Conference on Knowledge Discovery and Data Mining, 2017, 13 pages.

Gyarmati, et al., "Searching for a unique style in soccer," arXiv preprint arXiv:1409.0308, 2014, 4 pages.

PCT International Application No. PCT/US21/53117, International Search Report and Written Opinion of the International Searching Authority, dated Jan. 14, 2022, 9 pages.

Pourmehr, et al., "An overview on opponent modeling in RoboCup soccer simulation 2D," Springer, 2011, pp. 402-414.

Hubácek, et al., "Lifted Relational Team Embeddings for Predictive Sports Analytics," ILP Up-and-Coming/Short Papers, 2018, 7 pages.

Blaikie, et al., "NFL & NCAA Football Prediction using Artificial Neural network," Proceedings of the Midstates Conference for Undergraduate Research in Computer Science and Mathematics, 2011, 8 pages.

Zhao, Yu, et al., "Applying deep bidirectional LSTM and mixture density network for basketball trajectory prediction," Optik, 2018, pp. 266-272.

Wei, "Modelling and Predicting Adversarial Behaviors using Large Amounts of Spatiotemporal Data," Queensland University of Technology, 2016, 164 pages.

Carney, et al., "Predicting probability distributions for surf height using an ensemble of mixture density networks," Proceedings of the 22nd international conference on Machine learning, 2005, 8 pages.

Ji, et al., "NBA All-Star lineup prediction based on neural networks," 2013 International Conference on Information Science and Cloud Computing Companion, 2013, pp. 864-869.

Pettersson, et al., "Football match prediction using deep learning," Department of Electrical Engineering, Chalmers University of Technology, 2017, 72 pages.

Learned-Miller, "Data Driven Images Models through Continuous Joint Alignment", IEEE Transactions on Pattern Analysis and Machine Intelligence, vol. 28, No. 2, Feb. 2006, pp. 236-250.

Examination Report No. 1 for Australian Patent Application No. 2022201634 dated Mar. 7, 2023, 4 Pages.

(56) References Cited

OTHER PUBLICATIONS

Extended European Search Report for Application No. 20801519.8, dated May 19, 2023, 7 pages.
International Preliminary Report on Patentability for the Application No. PCT/US2021/053117, mailed Apr. 13, 2023, 8 pages.
Office Action for European Patent Application No. 20801519.8, mailed Jun. 6, 2023, 1 page.
Maher, "Modelling Association Football Scores", Statistica Neerlandica 36, nr.3, Published 1982, pp. 109-118.
Dixon, et al., "Modelling Association Football Scores and Inefficiencies in the Football Betting Market", Appl Statist 46. No 2, Published 1997, pp. 265-280.
Koopman, et al., "A dynamic bivariate Poisson model for analysing and forecasting match results in the English Premier League", Dated Sep. 24, 2012, 30 pages.
Boshnakov, et al., "A Bivariate Weibull Count Model For Forecasting Association Football Scores", Dated Sep. 9, 2016, 13 pages.
Boice, "How Our Club Soccer Projections Work", FiveThirtyEight, https://fivethirtyeight.com/features/how-our-club-soccer-projections-work/, Dated Jan. 19, 2017, 6 pages.
Goddard, et al., "Modelling football match results and the efficiency of fixed-odds betting", Published 2004, 27 pages.
Huang, et al., "A Neural Network Method for Prediction of 2006 World Cup Football game", Published 2010 IEEE, 8 pages.
Kharrat, et al., "Plus-Minus Player Ratings for Soccer", arXiv:1706.04943v1, Dated Jun. 16, 2017, 17 pages.
Dubow, "San Antonio Spurs' Kawhi Leonard ruled out for Game 2 vs. Golden State Warriors", http://www.nba.com/article/2017/05/15/san-antonio-spurs-kawhi-leonard-out-game-2, Dated May 15, 2017, 4 pages.
Beuoy, "Updated NBA Win Probability Calculator", InPredictable, http://www.inpredictable.com/2015/02/updated-nba-win-probability-calculator.html, Dated Feb. 6, 2015, 4 pages.
Asif, et al., "In-Play forecasting of win probability in One-Day International cricket: A dynamic logistic regression model", International Journal of Forecasting 32, Published 2016, pp. 34-43.
Pelechrinis, "iWinRNFL: A Simple, Interpretable & Well-Calibrated In-Game Win Probability Model for NFL", arXiv:1704.00197v3, Dated Mar. 14, 2018, 7 pages.
Lock, et al., "Using random forests to estimate win probability before each play of an NFL game", JQAS 2014; 10(2); Published 2014, pp. 197-205.
Schechtman-Rock, "Introducing NFLWin: An Open Source Implementation of NFL Win Probability", PhD Football, http://phdfootball.blogspot.com/2016/09/introducing-nflwin-open-source.html, Dated Sep. 1, 2016, 4 pages.
Bishop, "Mixture Density Networks", Neural Computing Research Group Report, NCRG/94/004, Dated Feb. 1994, 26 pages.
Kingma, et al., "Adam: A Method for Stochastic Optimization", arXiv:1412.6980v9, ICLR 2015, Dated Jan. 30, 2017, 15 pages.
Paine, "The Pats' Comeback Was Incredible—Even If You Think The Falcons Blew It", Five ThirtyEight, https://fivethirtyeight.com/features/patriots-falcons-comeback-super-bowl/, Dated Feb. 6, 2017, 4 pages.
Deerwester, et al., "Indexing by Latent semantic Analysis", Published 1990, 34 pages.
Blei, et al., "Latent Dirichlet Allocation", Journal of Machine Learning Research 3, Published 2003, pp. 993-1022.
Bengio, et al., "A Neural Probabilistic Language Model", Journal of Machine Learning Research 3, Published 2003, pp. 1137-1155.
Mikolov, et al., "Efficient Estimation of Word Representations in Vector Space", arXiv:1301.3781v3, Dated Sep. 7, 2013, 12 pages.
Mikolov, et al., "Distributed Representations of Words and Phrases and their Compositionality", Published 2013, 9 pages.
Ho, "Random Decision Forests", Published 1995 IEEE, pp. 278-282.
Van den Oord, et al., "WaveNet: A Generative Model For Raw Audio", arXiv:1609.03499v2, Dated Sep. 19, 2016, 15 pages.
Chung, et al., "Hierarchical Multiscale Recurrent Neural Networks", ICLR 2017, arXiv:1609.01704v7, Dated Mar. 9, 2017, 13 pages.
Graves, "Generating Sequences with Recurrent Neural Networks", arXiv:1308.0850v5, Dated Jun. 5, 2014, 43 pages.
Merhej, et al., "What Happened Next? Using Deep Learning to Value Defensive Actions in Football Event-Data," KDD, Aug. 2021, pp. 3394-3403.
PCT International Application No. PCT/US22/15240, International Search Report and Written Opinion of the International Searching Authority, dated May 11, 2022, 7 pages.
Dinsdale, et al., "Interactive Gaming in Sports," U.S. Appl. No. 17/934,756, filed Sep. 23, 2022, 39 pages.
PCT International Application No. PCT/US22/17229, International Search Report and Written Opinion of the International Searching Authority, dated Jun. 9, 2022, 9 pages.
PCT International Application No. PCT/US22/18709, International Search Report and Written Opinion of the International Searching Authority, dated Jun. 24, 2022, 11 pages.
Huang, et al., "Graph Analysis of Major League Soccer Networks: CS224W Final Project," http://snap.stanford.edu/class/cs224w-2018/reports/CS224W-2018-46.pdf, Dec. 9, 2018, 9 pages.
Tian, et al., "Use of machine learning to automate the identification of basketball strategies using whole team player tracking data," Applied Sciences 10.1, Dec. 18, 2019, 17 pages.
PCT International Application No. PCT/US21/34568, International Search Report and Written Opinion of the International Searching Authority, dated Aug. 25, 2021, 9 pages.
Wagenaar, et al. "Using deep convolutional neural networks to predict goal-scoring opportunities in soccer," International Conference on Pattern Recognition Applications and Methods, vol. 2, Scitepress, 2017, 8 pages.
Stein, et al. "Bring it to the pitch: Combining video and movement data to enhance team sport analysis," IEEE transactions on visualization and computer graphics 24.1,2017,, pp. 13-22.
Sha, et al., "Fine-Grained Retrieval of Sports Plays using Tree-Based Alignment of Trajectories", arXiv preprint arXiv:1710.02255, Oct. 6, 2017, 10 pages.
Lee, et al., "Desire: Distant Future Prediction in Dynamic Scenes with Interacting Agents", Proceedings of the IEEE Conference on Computer Vision and Pattern Recognition, 2017, 10 pages.
Alahi, et al., "Social LSTM: Human Trajectory Prediction in Crowded Spaces", Proceedings of the IEEE conference on computer vision and pattern recognition, 2016, 11 pages.
Jain, et al., "Recurrent Neural Networks for Driver Activity Anticipation via Sensory-Fusion Architecture", IEEE International Conference on Robotics and Automation (ICRA), 2016, 8 pages.
Akhter, et al., "Bilinear Spatiotemporal Basis Models", ACM Transactions on Graphics, vol. 30, No. 2, Article 17, Apr. 2012, 12 pages.
Lucey, et al., "Representing and Discovering Adversarial Team Behaviors using Player Roles", Proceedings of the IEEE Conference on Computer Vision and Pattern Recognition, 2013, 8 pages.
Insafutdinov, et al., "ArtTrack: Articulated Multi-Person Tracking in the Wild", Proceedings of the IEEE Conference on Computer Vision and Pattern Recognition, 2017, 9 pages.
Le, et al., "Coordinated Multi-Agent Imitation Learning", Proceedings of the 34th International Conference on Machine Learning—vol. 70. JMLR. org, 2017, 13 pages.
Yamaguchi, et al., "Who are you with and Where are you going?", CVPR 2011. IEEE, 2011, 8 pages.
Butt, et al., "Multi-target Tracking by Lagrangian Relaxation to Min-Cost Network Flow", Proceedings of the IEEE Conference on Computer Vision and Pattern Recognition, 2013, 8 pages.
Wang, et al., "Learning Optimal Parameters For Multi-target Tracking", International journal of computer vision 122.3 , 2017, 13 pages.
Maksai, et al., "What Players do with the Ball: A Physically Constrained Interaction Modeling", Proceedings of the IEEE Conference on Computer Vision and Pattern Recognition, 2016, 10 pages.
Kim, et al., "Motion Fields to Predict Play Evolution in Dynamic Sport Scenes", IEEE Computer Society Conference on Computer Vision and Pattern Recognition, 2010, 8 pages.

(56) References Cited

OTHER PUBLICATIONS

Chen, et al., "Learning Online Smooth Predictors for Realtime Camera Planning using Recurrent Decision Trees", Proceedings of the IEEE Conference on Computer Vision and Pattern Recognition, 2016, 14 pages.

Zheng, et al., "Generating Long-term Trajectories Using Deep Hierarchical Networks", Advances in Neural Information Processing Systems, 2016, 9 pages.

Felsen, et al., "What will Happen Next? Forecasting Player Moves in Sports Videos", Proceedings of the IEEE International Conference on Computer Vision, 2017, 10 pages.

Su, et al., "Social Behavior Prediction from First Person Videos", arXiv preprint arXiv:1611.09464, Nov. 29, 2016, 10 pages.

Koren, et al., "Matrix Factorization Techniques For Recommender Systems", Computer, IEEE Computer Society, Aug. 2009, 8 pages.

Deng, et al., "Factorized Variational Autoencoders for Modeling Audience Reactions to Movies", Proceedings of the IEEE Conference on Computer Vision and Pattern Recognition, 2017, 10 pages.

Charles, et al., "Personalizing Human Video Pose Estimation", Proceedings of the IEEE conference on computer vision and pattern recognition, 2016, 14 pages.

Kingman, et al., "Auto-Encoding Variational Bayes", arXiv preprint arXiv:1312.6114, May 1, 2014, 14 pages.

Gregor, et al., "Draw: A Recurrent Neural Network For Image Generation", arXiv preprint arXiv:1502.04623, May 20, 2015, 10 pages.

Bowman, et al., "Generating Sentences from a Continuous Space", arXiv preprint arXiv:1511.06349, May 12, 2016, 12 pages.

Kingma, et al., "Semi-supervised Learning with Deep Generative Models", Advances in neural information processing systems, Oct. 31, 2014, 9 pages.

Sohn, et al., "Learning Structured Output Representation using Deep Conditional Generative Models", Advances in neural information processing systems, 2015, 9 pages.

Van den Oord, et al., "Pixel Recurrent Neural Networks", arXiv preprint arXiv:1601.06759, Aug. 19, 2016, 11 pages.

Pathak, et al., "Contect Encoders: Feature Learning by Inpainting", Proceedings of the IEEE conference on computer vision and pattern recognition, 2016, 12 pages.

Walker, et al., "An Uncertain Future: Forecasting from Static Images using Variational Autoencoders", European Conference on Computer Vision, 2016, 17 pages.

\* cited by examiner

SYSTEM AND METHOD FOR CONTENT AND STYLE PREDICTIONS IN SPORTS

CROSS-REFERENCE TO RELATED APPLICATION INFORMATION

This is a continuation of U.S. patent application Ser. No. 16/870,170, filed May 8, 2020, which claims priority to U.S. Provisional Application Ser. No. 62/844,874, filed May 8, 2019, which are incorporated by reference in their entireties.

FIELD OF THE DISCLOSURE

The present disclosure generally relates to system and method for generating content and style predictions in sports.

BACKGROUND

How does one predict a player who has only ever played zone will play in man-to-man or predict how a player plays on the right wing, when all that player has done is play on the left? How does one predict how a team will play against the high press when they have not faced the high press before? How will a team react to an unseen situation? These are the types of questions that drive sports analytics. The challenge in answering these questions is having the right kinds and sufficient amounts of data, as well as the correctly trained algorithms for making such predictions.

SUMMARY

Embodiments disclosed herein generally relate to a system and method for generating a content and style prediction in sports. In one embodiment, a method of generating a play prediction for a team is disclosed herein. A computing system trajectory data for a plurality of plays from a data store. The computing system generates a predictive model using a variational autoencoder and a neural network by generating one or more input data sets, learning, by the variational autoencoder, to generate a plurality of variants for each play of the plurality of plays, and learning, by the neural network, a team style corresponding to each play of the plurality of plays. Each input data set includes tracking information for a play of the plurality of plays. Each variant includes trajectory information corresponding thereto. The computing system receives trajectory data corresponding to a target play. The predictive model generates a likelihood of a target team executing the target play by determining a number of target variants that correspond to a target team identity of the target team.

In another embodiment, a system for generating a play prediction for a team is disclosed herein. The system includes a processor and a memory. The memory has programming instructions stored thereon, which, when executed by the processor, performs one or more operations. The one or more operations include retrieving trajectory data for a plurality of plays from a data store. The one or more operations further include generating a predictive model using a variational autoencoder and a neural network by generating one or more input data sets, learning, by the variational autoencoder, to generate a plurality of variants for each play of the plurality of plays, and learning, by the neural network, a team style corresponding to each play of the plurality of plays. Each input data set includes tracking information for a play of the plurality of plays. Each variant includes trajectory information corresponding thereto. The one or more operations further include receiving event data corresponding to a target play. The event data include s trajectory data for the target play. The one or more operations further include generating, via the predictive model, a likelihood of a target team executing the target play by determining a number of target variants that correspond to a target team identity of the target team.

In another embodiment, a non-transitory computer readable medium is disclosed herein. The non-transitory computer readable medium includes one or more sequences of instructions that, when executed by the one or more processors, causes one or more operations. The one or more operations include retrieving trajectory data for a plurality of plays from a data store. The one or more operations further include generating a predictive model using a variational autoencoder and a neural network by generating one or more input data sets, learning, by the variational autoencoder, to generate a plurality of variants for each play of the plurality of plays, and learning, by the neural network, a team style corresponding to each play of the plurality of plays. Each input data set includes tracking information for a play of the plurality of plays. Each variant includes trajectory information corresponding thereto. The one or more operations further include receiving trajectory data corresponding to a target play. The one or more operations further include generating, via the predictive model, a likelihood of a target team executing the target play by determining a number of target variants that correspond to a target team identity of the target team.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Discrete sports, such as baseball, are well-defined by coarse event-based descriptors, such as, balls, strikes, hits, and outs. Even more specific variants of these events, such as the play "ground-out to the shortstop," can be discrete, labeled, counted, and analyzed. Furthermore, the natural discrete hierarchy of these labels means that the relationship between plays is easily captured, as well. As a result, the set of all possible events may be finite, well-defined, and (comparatively) small. Therefore, the task of answering questions related to how a team may behave in situations becomes a matter of looking up or retrieving similar examples.

In contrast, continuous sports, such as basketball and soccer, are poorly described by events alone. To describe a play, tracking data is typically used. However, tracking-based description suffers from the curse of dimensionality. In soccer, for example, a fifteen second tracking sequence may consist of nearly 3500 degrees of freedom (e.g., 15 seconds×10 frames per second×2 spatial dimensions×11 players per team×2 teams). With each degree of freedom (E.g., corresponding to a coordinate on the pitch (i.e., field)) being a continuous variable, the potential variability between plays may be massive and any two players may be likely to be far away from one another. Even with tracking data across dozens of leagues and decades of play, there may never be enough data because the set of many contexts and scenarios may be too diverse.

Such problem becomes even more complicated in the world of soccer where two teams from different leagues may rarely, or potentially never, play against one another. This means that in major tournaments, such as the Champions League, there may be many first time match-ups. Therefore, simply looking up similar situations is insufficient to the task.

The one or more techniques disclosed herein address the limitations of conventional systems through the use of generative models and neural networks. The generative models disclosed herein provide the system with the power to create, and therefore understand, complex, continuous, and adversarial sports, such as soccer, basketball, and the like. For example, the generative models disclosed herein allows the system to synthesize many (e.g., infinitely) many variants of any play, which may unlock an improved understanding of how a play may be executed. The neural networks disclosed herein allow the system to identify a team associated with each play and each variant thereof. With the combined generative models and neural networks, the system may be able to disentangle play content with play style. Such disentanglement may allow one to understand the similarity between teams both in types of plays that each team runs and the style and nuance with which each team executes them.

Figure 1:
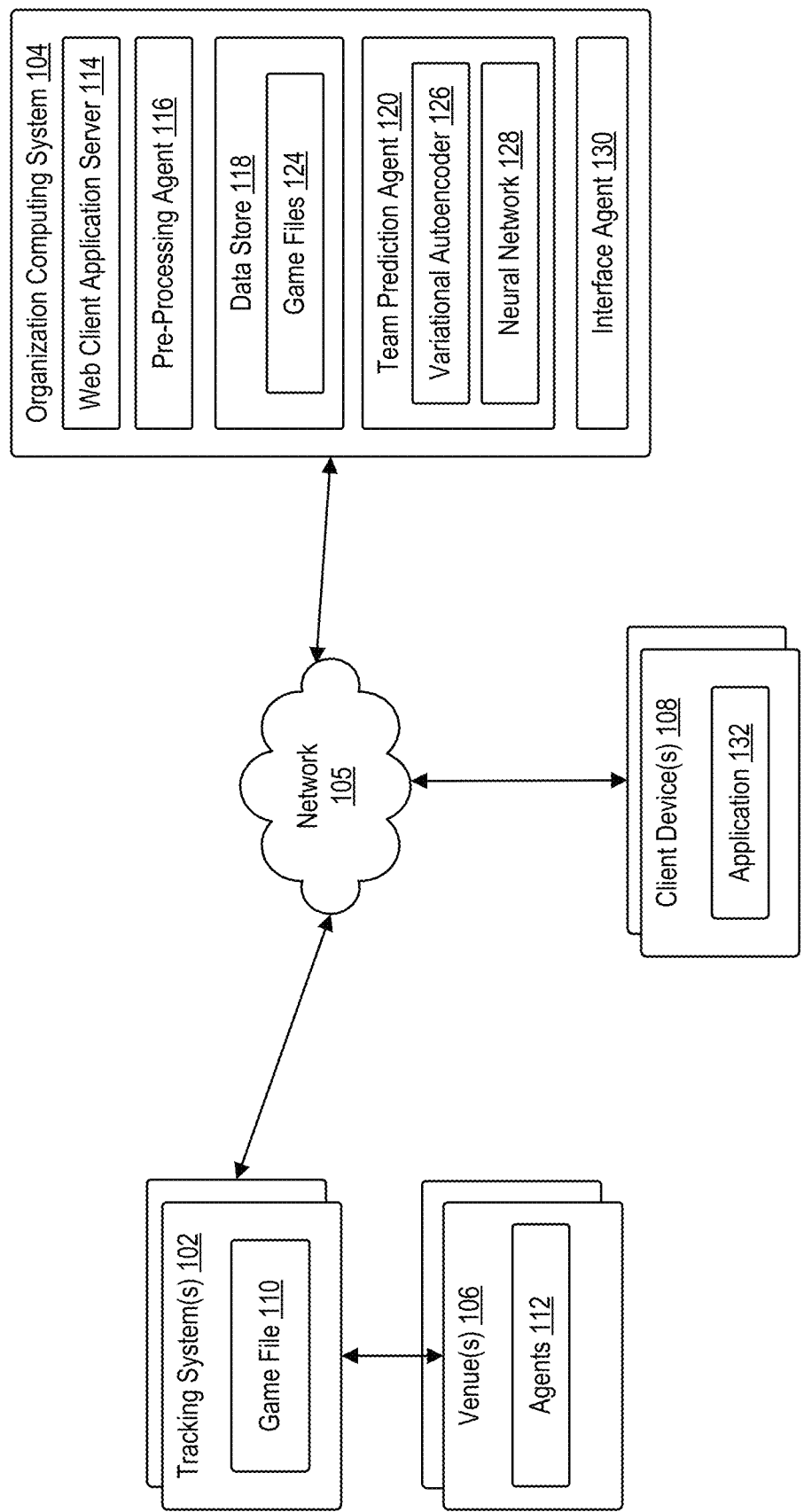
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects on the playing surface for each frame in a game file 110.

Game file 110 may be augmented with other event information corresponding to event data, such as, but not limited to, game event information (play, tackle, possession, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing agent 116, a data store 118, and team prediction agent 120. Each of pre-processing agent 116 and team prediction agent 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include spatial event data and non-spatial event data. For example, spatial event data may correspond to raw data captured from a particular game or event by tracking system 102. Non-spatial event data may correspond to one or more variables describing the events occurring in a particular match without associated spatial information. For example, non-spatial event data may include play-by-play information for each match. In some embodiments, non-spatial event data may be derived from spatial event data. For example, pre-processing agent 116 may be configured to parse the spatial event data to derive play-by-play information. In some embodiments, non-spatial event data may be derived independently from spatial event data. For example, an administrator or entity associated with organization computing system may analyze each match to generate such non-spatial event data. As such, for purposes of this application, event data may correspond to spatial event data and non-spatial event data.

Pre-processing agent 116 may be configured to process data retrieved from data store 118. For example, pre-processing agent 116 may be configured to generate one or more sets of information that may be used to train one or more or more prediction models associated with team prediction agent 120. Pre-processing agent 116 may scan each of the one or more game files stored in data store 118 to identify one or more metrics corresponding to each player. For example, pre-processing agent 116 may scan each of the one or more game files in data store 118 to identify one or more plays in each game, and identify event and tracking data associated with each play. Tracking data may include the trajectory of each player involved in the play. Event data may include information surrounding the possession, play style, team identities, and the like.

Team prediction agent 120 may be configured to generate a prediction of whether a team is likely to execute a play or a variant of a given play. For example, team prediction agent 120 may be configured to analyze tracking data and event data corresponding to a given play, generate one or more variants of each play, and determine the likelihood of a team executing each variant of the play. In particular, the goal of team prediction agent 120 may be to identify the "style" and content" of a given play. Content of a given play may be referred to as the "what" of the play, independent of the exact specifics of how a team executes the play. In contrast, style may be referred to as the "how" of the play, which captures the various ways a given play can involve.

Team prediction agent 120 may include variational autoencoder 126 and neural network 128. Variational autoencoder 126 may be configured to generate one or more variants of a given play. For example, variational autoencoder 126 is a generative model configured to receive an input play, and then generate an arbitrary amount of variants of this play. Generally, variational autoencoder 126 may be able to generate infinitely many variants of a single play. As such, variational autoencoder 126 may be tasked with generating the one or more plays based on the "content" of the input play. Neural network 128 may be configured to determine a likelihood of a given team executing each input play, and the one or more variants thereof. In some embodiments, neural network 128 may be a feedforward network that produces a likelihood of a given variant being in a style of a given team. As such, neural network 128 may be tasked with identifying the "style" of a given play to determine whether that style fits with a particular team. Accordingly, variational autoencoder 126 and neural network 128 may work in conjunction to generate a prediction as to whether a team is likely to execute a play or some variant thereof.

Interface agent 130 may be configured to generate one or more graphical representations corresponding to the team prediction generated by team prediction agent 120. For example, interface agent 130 may be configured to generate one or more graphical user interfaces (GUIs) that include graphical representations of each prediction generated by team prediction agent 120. Exemplary GUIs are discussed below in conjunction with FIGS. 6A-7.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2:
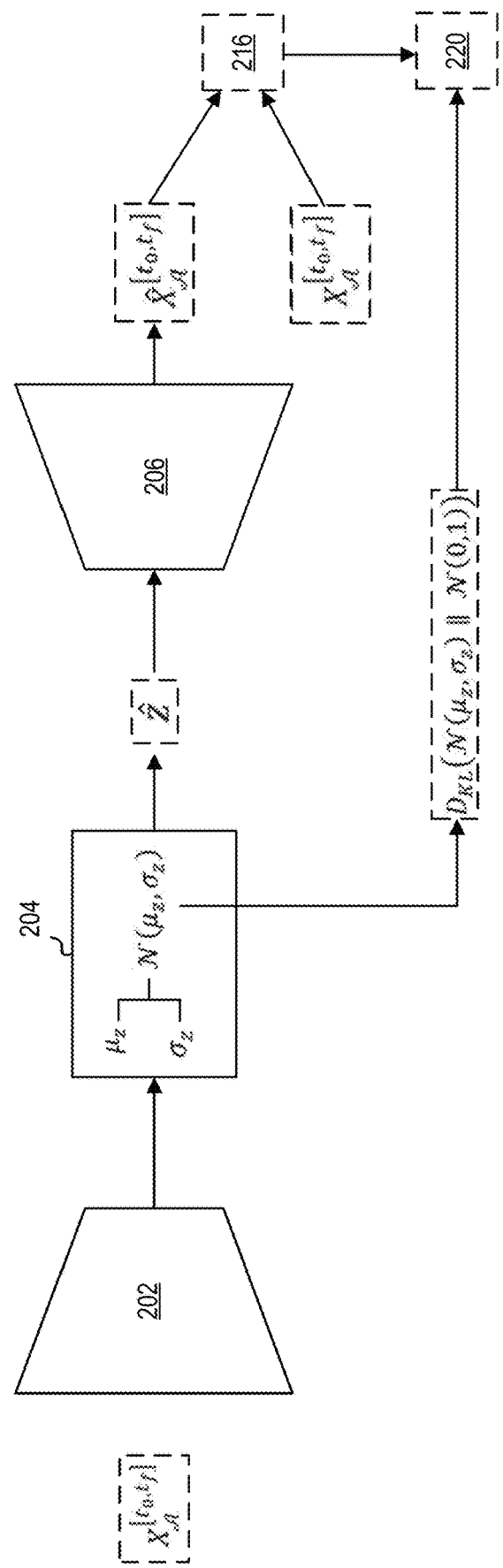
FIG. 2 is a block diagram illustrating a structure of a variational autoencoder, according to example embodiments.

FIG. 2 is a block diagram illustrating variational autoencoder structure 200, according to example embodiments. Variational autoencoder structure 200 may represent variational autoencoder 126.

Variational autoencoders are a type of deep generative model that are useful in image synthesis, handwriting generation, and speech. The one or more techniques herein may leverage the generative power of variational autoencoder 126 to generate all possible (or a subset thereof) variants of an observed play. For example, variational autoencoder 126 may be configured to generate the motions of all players on both teams and the ball simultaneously. For example, for soccer, variational autoencoder 126 may be configured to generate the trajectories of all twenty-three agents across a thirty second span. Generating the motion together, allows team prediction agent 120 to capture the full adversarial nature of continuous sports and all of its complex interactions.

As illustrate, variational autoencoder structure 200 may include an encoder 202, a variational latent layer 204, and a decoder 206. Encoder 202 may include one or more fully connected encoding layers. For example, encoder 202 may include three fully connected (dense) encoding layers. Encoder 202 may be configured to generate a latent representative space z based on the input provided thereto.

Variational latent layer 204 may be configured to compress data passed by encoder 202. For example, variational latent layer 204 may have a dimension of 863 and may be configured to compress the data by 25%. Variational latent layer 204 may be configured to generate a sample, ẑ, of the latent representative space z. Decoder 206 may include one or more fully connected decoding layers. In some embodiments, each of the fully connected layers may use exponential linear unit (i.e., "elu") activation.

As illustrated, model input may be represented by $X_{\mathcal{A}}^{[t_0, t_f]}$.

$X_{\mathcal{A}}^{[t_0, t_f]}$ may represent tracking data for a given game. The set $\mathcal{A}$ of players and ball may be observed over the time $[t_0, t_f]$ to have trajectories $X_{\mathcal{A}}^{[t_0, t_f]} = \{X_i^{[t_0, t_f]}\}$ |∀i ∀$\mathcal{A}$. For example, the trajectory of the $i^{th}$ player may be defined as $X_i^{[t_0, t_f]} = \{x_i^{t_0}, x_i^{t_0+1}, \ldots, x_i^{t_f}\}$, where $x_i^t$ may represent the two-dimensional coordinates of the trajectory at time t for player i. In some embodiments, this tracking data may be captured by tracking system 102 at 10 Hz, and may be down-sampled to 5 Hz.

The input, $X_{\mathcal{A}}^{[t_0, t_f]}$, may be provided to encoder 202. The last layer of encoder 202 may be provided to variational latent layer 204. Variational latent layer 204 may be configured to predict the mean, $\mu_z$, and standard deviation, $\sigma_z$, of the latent variable distribution, $\mathcal{N}(\mu_z, \sigma_z)$. Variational latent layer 204 may provide the distribution of the latent variable (e.g., ẑ) to decoder 206. Decoder 206 may take the latent variable z and decode it to generate a set of predicted tracks, $\hat{X}_{\mathcal{A}}^{[t_0, t_f]}$, where $t_f$ is some time after $t_q$.

In some embodiments, team prediction agent 120 may minimize the L2 loss (reference numeral "216") of the generated sample and the input sample, i.e.:

$$L_R = \| X_{\mathcal{A}}^{[t_0, t_f]} - \hat{X}_{\mathcal{A}}^{[t_0, t_f]} \|_2^2$$

Such minimization may aid in checking whether the generated sample is of the same class as the input sample. Additionally, to capture the set of all plays in the family, in some embodiments, team prediction agent 120 may maximize the Evidence Lower Bound (ELBO) using a normal distribution as a prior, i.e., team prediction agent 120 may minimize the Kullback-Leibler (KL) divergence:

$$D_{KL}(\mathcal{N}(\mu_z, \sigma_z) \| \mathcal{N}(0, 1))$$

To balance the effects of the two loss functions, in some embodiments, team prediction agent 120 may define the total loss (reference numeral "220") as $L = \beta D_{KL} + L_R$. In some embodiments, team prediction agent 120 may train the prediction model using Adam optimizer.

Figure 3:
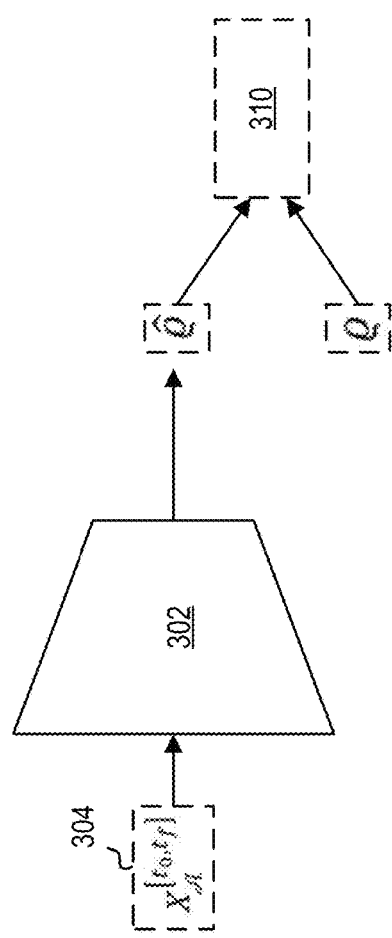
FIG. 3 is a block diagram illustrating a structure of a neural network, according to example embodiment.

FIG. 3 is a block diagram illustrating a neural network structure 300, according to example embodiment. Neural network structure 300 may be representative of a structure for neural network 128. As illustrated, neural network structure 300 may include a team classifier 302. Team classifier 302 may be a fully-connected feed forward network that may receive $X_{\mathcal{A}}^{[t_0, t_f]}$ as input (reference numeral 304) and may predict the team identity $\varrho$ of the first team listed in the input data set. In some embodiments, team classifier 302 may include one or more layers (e.g., four) with rectified linear unit ("relu") activation and an output layer with softmax activations. In some embodiments, the input layer may use a tanh activation. In some embodiments, team prediction agent 120 may train the prediction model using an Adam optimizer to reduce (e.g., minimize) the cross-entropy loss (reference numeral 310) between a predicted team identity, $\hat{\varrho}$, and the actual team identity, $\varrho$.

Figure 4:
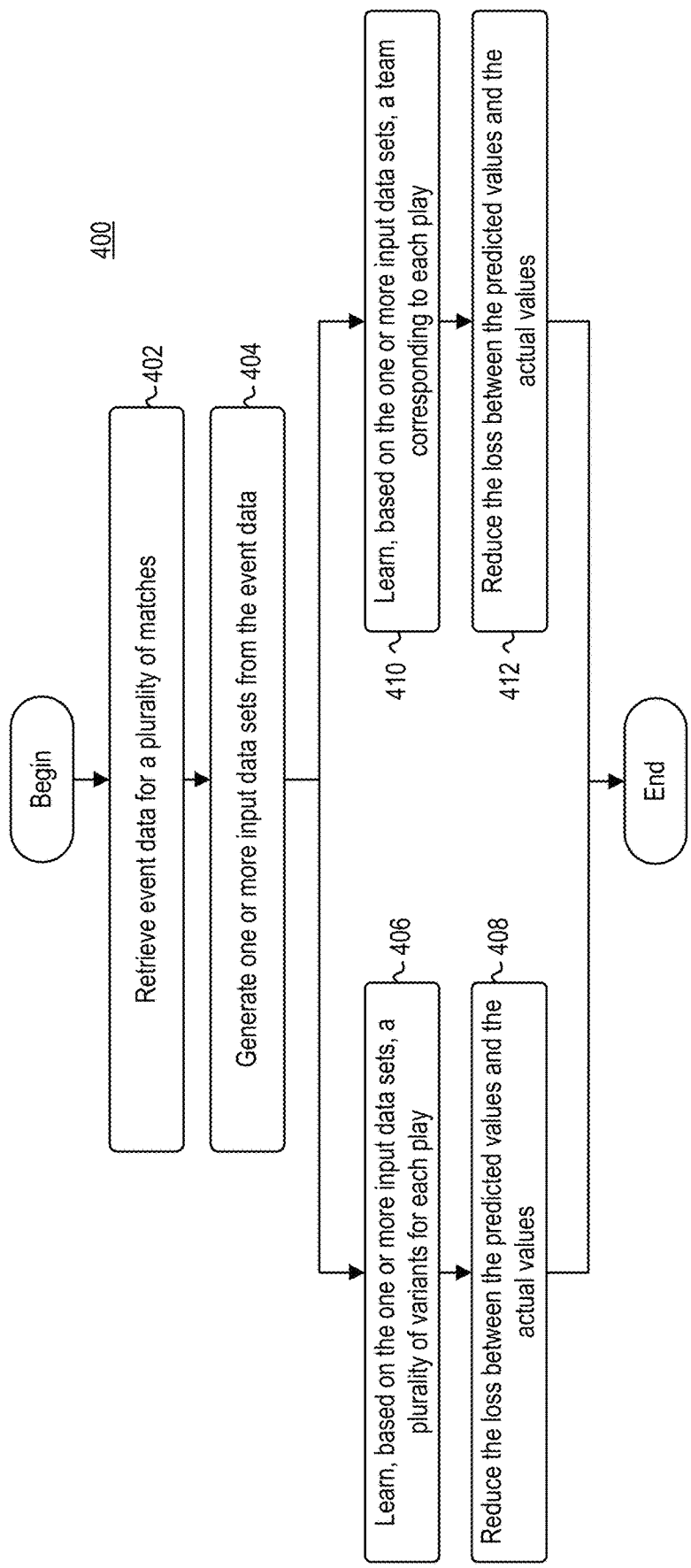
FIG. 4 is a flow diagram illustrating a method of generating a fully trained prediction model, according to example embodiments.

FIG. 4 is a flow diagram illustrating a method 400 of generating a fully trained prediction model, according to example embodiments. Method 400 may begin at step 402.

At step 402, organization computing system 104 may retrieve event data for a plurality of matches. For example, pre-processing agent 116 may retrieve tracking data from data store 118. Tracking data may capture every touch of the ball, with x, y coordinates and time stamps. Tracking data may also capture the x, y coordinates and time stamps associated with the ball.

At step 404, organization computing system 104 may generate one or more input data sets based on the event data. For example, pre-processing agent 116 may be configured to generate a plurality of inputs, each input representing a pre-determined duration of play during a match. For example, pre-processing agent 116 may parse the tracking data to generate one or more sets of trajectories, $X_{\mathcal{A}}^{[t_0, t_f]}$, where $\mathcal{A}$ represents the set of all players in the set. In some embodiments, for each input, pre-processing agent 116 may enrich the data. For example, pre-processing agent 116 may enrich the data with information surrounding one or more of the possession, playing style, and team identities, $\varrho$. In some embodiments, the team identities may be one-hot encoded. In some embodiments, an input data set may represent a single possession. In some embodiments, an input data set may represent a span of multiple possessions. Still further, in some embodiments, pre-processing agent 116 may align the players on each team to a global template to reduce (e.g., eliminate) permutation noise.

At step 406, organization computing system 104 may learn, based on the one or more input data sets, a plurality of variants for each play. In other words, team prediction agent 120 may generate one or more variants associated with each input data set. For example, team prediction agent 120 may be configured to train variational autoencoder 126 using the one or more input data sets to generate one or more variants of each play. For example, given an input data set $X_{\mathcal{A}}^{[t_0, t_f]}$, variational autoencoder 126 may generate a plurality of variants. Each variant may be represented by $\hat{X}_{\mathcal{A}}^{[t_0, t_f]}$.

At step 408, organization computing system 104 may reduce any loss between the predicted values and the actual values. For example, as part of the training process, team prediction agent 120 may minimize the L2 loss (i.e., 216) of the generated sample and the input sample, i.e.: $L_R = \| X_{\mathcal{A}}^{[t_0, t_f]} - \hat{X}_{\mathcal{A}}^{[t_0, t_f]} \|_2^2$. Such minimization may aid in checking whether the generated sample is of the same class as the input sample. Additionally, to capture the set of all plays in the family, in some embodiments, team prediction agent 120 may maximize the Evidence Lower Bound (ELBO) using a normal distribution as a prior, i.e., team prediction agent 120 may minimize the Kullback-Leibler (KL) divergence, $D_{KL}(\mathcal{N}(\mu_z, \sigma_z) \| \mathcal{N}(0, 1))$. To balance the effects of the two loss functions, in some embodiments, team prediction agent 120 may define the total loss (i.e., 220) as $L = \beta D_{KL} + L_R$. In some embodiments, team prediction agent 120 may train the prediction model using Adam optimizer.

At step 410, organization computing system 104 may learn, based on one or more input data sets, a team identity corresponding to each input data set. In other words, team prediction agent 120 may generate prediction of at least one team identity associated with each input data set. For example, team prediction agent 120 may be configured to train neural network 128 to predict one or more teams associated with each play based on, for example, one or more trajectory based features in the input data sets. For example, given an input data set $X_\mathcal{A}^{[t_0,t_f]}$, neural network 128 may generate a predicted team identity, $\hat{\varrho}$.

At step 412, organization computing system 104 may reduce any loss between the predicted values and the actual values. For example, as part of the training process, team prediction agent 120 may train the prediction model using an Adam optimizer to reduce (e.g., minimize) the cross-entropy loss between a predicted team identity, $\hat{\varrho}$, and the actual team identity, $\varrho$, associated with each play.

Figure 5:
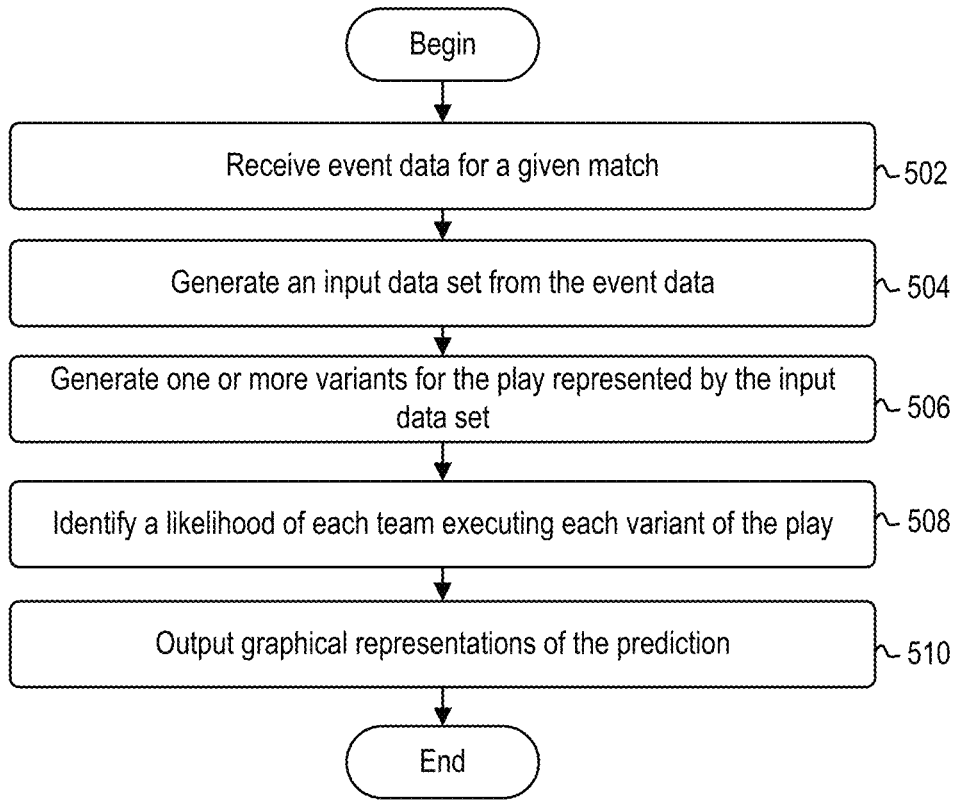
FIG. 5 is a flow diagram illustrating a method of generating a team predicting using the fully trained model, according to example embodiments.

FIG. 5 is a flow diagram illustrating a method 500 of generating a play prediction for a team using the fully trained model, according to example embodiments. Method 500 may begin at step 502.

At step 502, organization computing system 104 may receive match data for a given match. For example, pre-processing agent 116 may receive tackle information for a given play in a particular match. In some embodiments, pre-processing agent 116 may receive one or more sets of tracking data. For example, pre-processing agent 116 may receive a set of tracking data corresponding to a given play.

At step 504, organization computing system 104 may extract, from the match data, one or more portions of data corresponding to a given play. In some embodiments, the set of tracking data may correspond to a single possession. In some embodiments, the set of tracking data may span several possessions. In some embodiments, pre-processing agent 116 may enrich the data. For example, pre-processing agent 116 may enrich the data with information surrounding one or more of the possession, playing style, and team identities, $\varrho$.

At step 506, organization computing system 104 may generate one or more variants associated with each play. For example, team prediction agent 120 may generate the one or more variants based on the tracking information associated with each play. Team prediction agent 120 may pass the tracking information through variational autoencoder 126. The output may represent one or more (e.g., a plurality) of variant plays based on the input play. In some embodiments, team prediction agent 120 may limit the number of variants produced by variational autoencoder 126. For example, team prediction agent 120 may limit the number of variants to 1000. Mathematically, variational autoencoder 126 may receive, as input, the set $X_\mathcal{A}^{[t_0,t_q]}$ and generate, as output, one or more sets $\hat{X}_\mathcal{A}^{[t_0,t_q]}$.

At step 508, organization computing system 104 may predict the likelihood of a team executing each play. For example, team prediction agent 120 may predict at least one team corresponding the each play and variant generated in step 506. Team prediction agent 120 may generate such team prediction by providing neural network 128 with the tracking data corresponding to each play. For example, neural network 128 may receive, as input, the set $X_\mathcal{A}^{[t_0,t_f]}$ and one or more sets, $\hat{X}_\mathcal{A}^{[t_0,t_f]}$, where $X_\mathcal{A}^{[t_0,t_f]}$ represents a play and each set, $\hat{X}_\mathcal{A}^{[t_0,t_f]}$, represents a variant thereof. As output, neural network 128 may generate a team identity, $\varrho$, for each play. To determine the likelihood of a particular team executing a given play, represented by sets, $X_\mathcal{A}^{[t_0,t_f]}$, team prediction agent 120 may identify how many variants with which each team is associated.

At step 510, organization computing system 104 may generate one or more graphical representations of the prediction. For example, interface agent 130 may generate one or more graphical representations trajectories of each play corresponding to a given variant and a team corresponding thereto. Exemplary graphical representations may be found below in conjunction with FIGS. 6A-7.

Figure 6A:
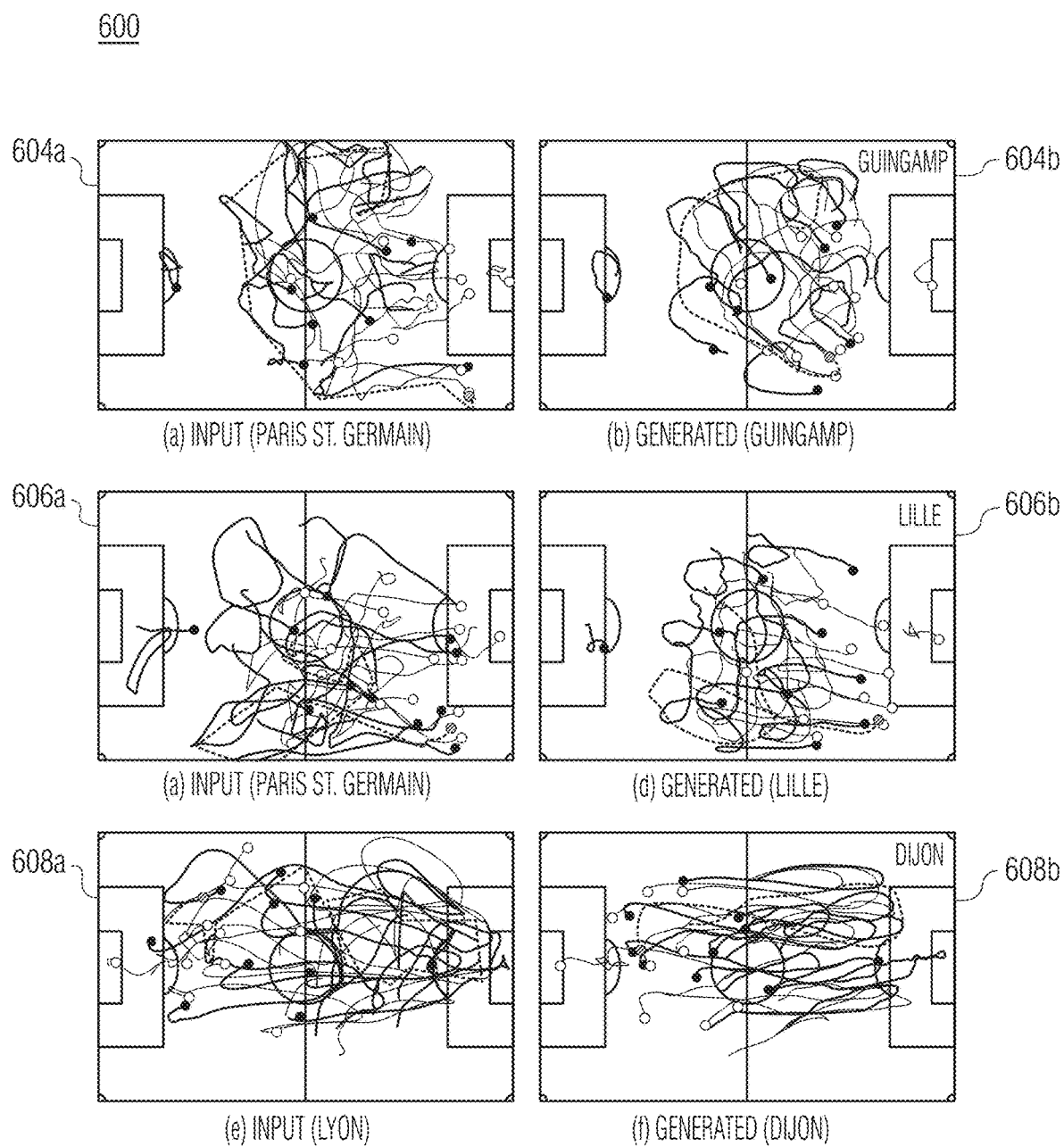
FIG. 6A is a block diagram illustrating one or more graphical representations of input plays and variants thereof, according to example embodiments.

FIG. 6A is a block diagram 600 illustrating one or more graphical representations of input plays and variants thereof, according to example embodiments. For example, graphical element 604a may correspond to a first input play and graphical element 604b may correspond to a first variant of first input play, as generated by team prediction agent 120. Graphical element 606a may correspond to a second input play and graphical element 606b may correspond to a second variant of second input play. Graphical element 608a may correspond to a third input play and graphical element 608b may correspond to a third variant of third input play.

As illustrated from each set of corresponding graphical elements, variational autoencoder 126 may maintain the content of each play, while changing the style. In the first row, a team begins on the left wing, passes back to the defense, and then advances down the right wing. In the input play (illustrated in graphical element 604a), Paris St. Germain (PSG) executes the play with more width, and the play advances much more quickly as compared to a variant thereof which corresponds to Guingamp (represented by graphical element 604b). Such analysis is consistent with objective viewings of the two teams, as PSG has superior wingers and crosses the ball more often compared to Guingamp.

In the second row, another example from PSG is shown. Variational autoencoder 126 maintains the content of each player. The input play (represented by graphical element 606a) include PSG winning the ball near the middle of the field, passing it back to the wing, back to the defense, and then quickly advancing the ball up the right wing. In the generated variant play (represented by graphical element 606b), Lille starts the ball from the farther left side of the field. Further, it is shown that Lille executes the play with a higher defensive line, attacks more centrally, and the opposite wing stays wider as compared to PSG.

In the last row, a counter-attack from Lyon is illustrated as the input play (represented by graphical element 608a). In the generated variant (represented by graphical element 608b), Dijon executes a similar counter-attack. However, Dijon attacks more centrally and directly than Lyon.

Generally, FIG. 6A illustrates that variational autoencoder 126 may generate variants of the same playing style, while preserving the content of a given input play. Further, FIG. 6A illustrates that the team classifier, generated by neural network 128) may be consistent in its classification of team styles across different contents.

Such methodologies allow team prediction agent 120 to support enhanced retrieval methods. For example, typical retrieval methods may be limited by two factors: visible data and a semantically-limit metric. In other words, conventional methods are only capable of finding similar plays that exist. Through the use of variational autoencoder 126, team prediction agent 120 may generate visualizations all stylistic variations of a particular play/content, even if those plays/contents have not yet been witnessed. Further, through the operations discussed herein, similarity may now be defined, not merely based on a purely spatial metric), but based on how similar the contents (e.g., is it generated by a given input) and styles (is it characteristic of a particular team).

Figure 6B:
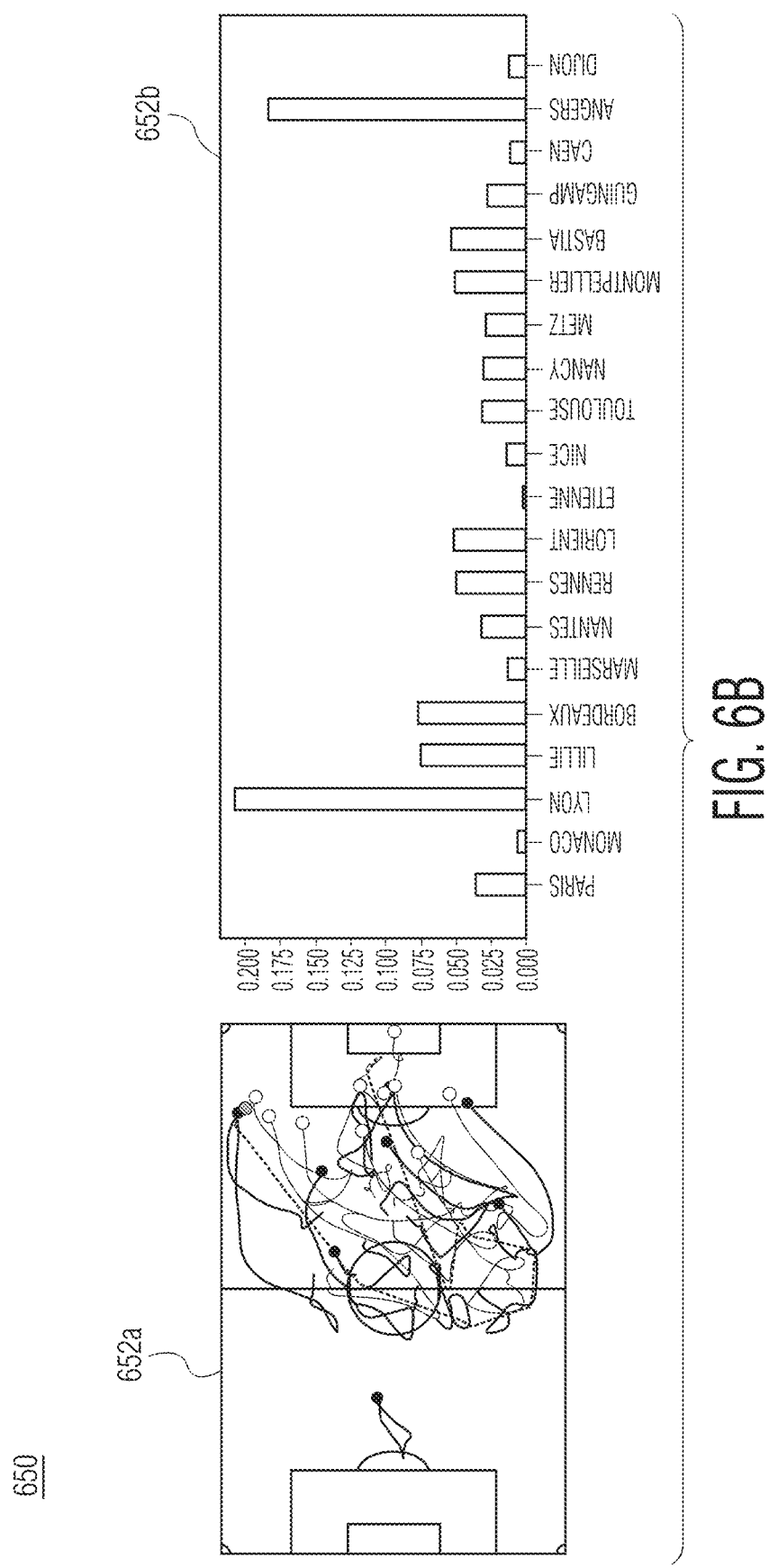
FIG. 6B is a block diagram representing one or more graphical representations, according to example embodiments.
Figure 6C:
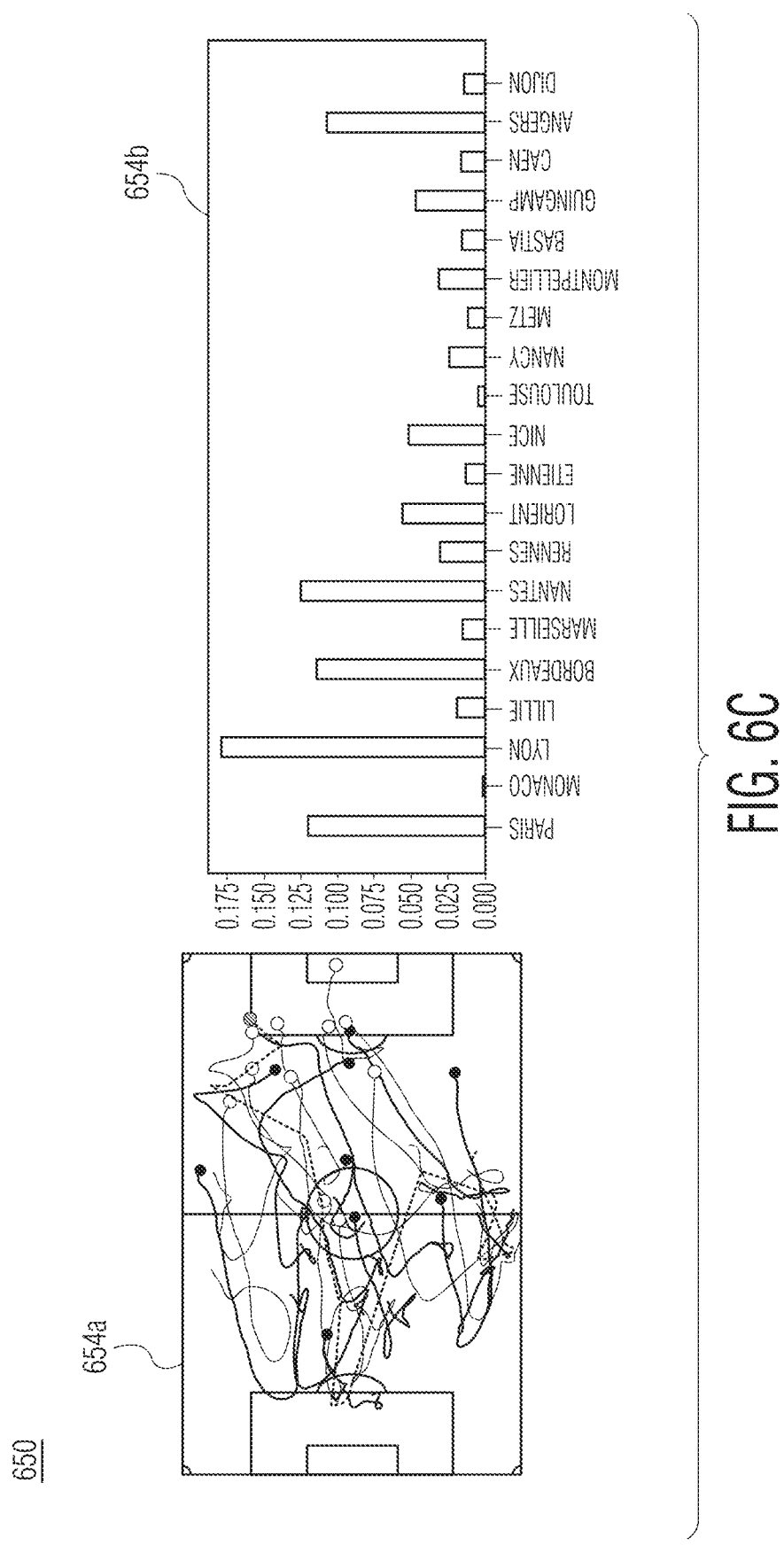
FIG. 6C is a block diagram representing one or more graphical representations, according to example embodiments.

FIGS. 6B and 6C is are block diagrams 650 (spread over two Figures) representing one or more graphical representations, according to example embodiments. For example, as illustrated, block diagram 650 includes graphical representation 652a, 652b, 654a, and 654b. Graphical representation 652a may illustrate a first input play. Graphical representation 652b may illustrate a histogram illustrating the likelihood of each team executing the first input play (or a variant thereof) across a number of samples (e.g., 1000). Graphical representation 654a may illustrate a second input play. Graphical representation 654b may illustrate a histogram illustrating the likelihood of each team executing the second input play (or a variant thereof) across a number of samples (e.g., 1000).

By using variational autoencoder 126 and neural network 128, one can see how different teams would execute the same play. However, this does not mean that team prediction agent 120 can generate how every team would play in a given situation (i.e., input play), because not every team can or would execute that play or a variant thereof. For example, most teams may not counter-attack down the right after starting from the left, but Metz and Dijon might.

In some embodiments, for a given content, only a limited number of styles/teams may be generated, because not all teams can do all things. In other words, not all things can happen in a given situation. By using a variational autoencoder 126, team prediction agent 120 can perform an exhaustive search of the set of possible outcomes, rather than a single observed outcome.

Figure 7:
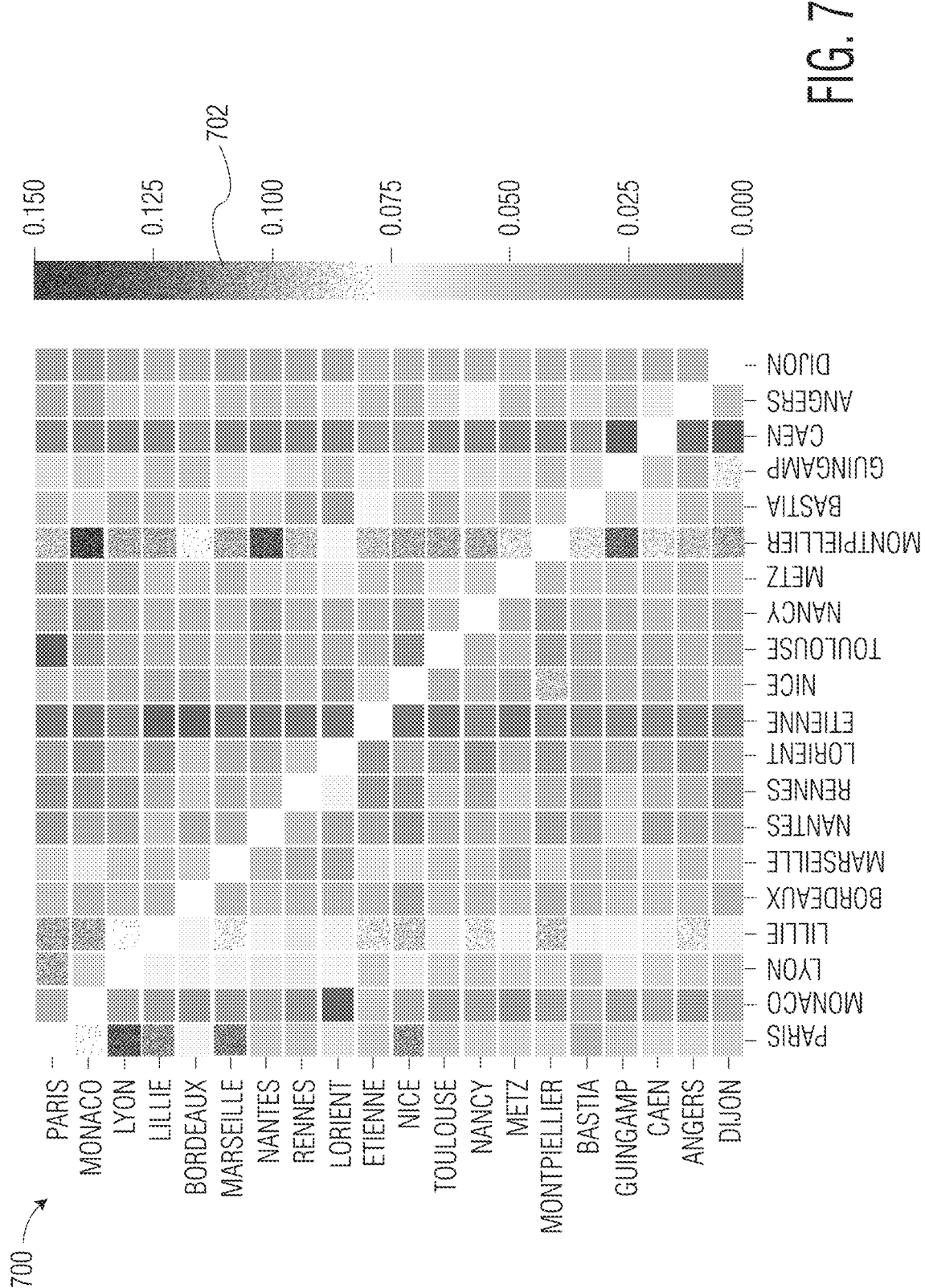
FIG. 7 is a block diagram illustrating a team similarity matrix, according to example embodiments.

FIG. 7 is a block diagram 700 illustrating a team similarity matrix 702, according to example embodiments. To understand the content relationship between any two teams, team prediction agent 120 may take an input play from team i and generate a plurality of variants (e.g., 1000). Team prediction agent 120 may determine how often a variant is generated for a given team j. Performing such analysis over every play may generate the set $S_{ij}$ of the likelihood that content from team i may generate team j. In other words, $S_{ij}$ may represent the likelihood, on average, that team j will try the same thing as team i in a given situation.

As illustrated, for example, all teams in the analysis generate Montpellier. Such analysis may be the result of Montpellier acting similar to general soccer. Additionally, team similarity matrix 702 illustrates that Lille, Monaco, and Nice attempt the same plays as PSG very often, despite doing so in different styles. Team similarity matrix 702 further illustrates that no team tries to do what Etienne and Caen do. In other words, Etienne and Caen have unique content, and the only way to play in those situations is in the style of Etienne and Caen.

Figure 8A:
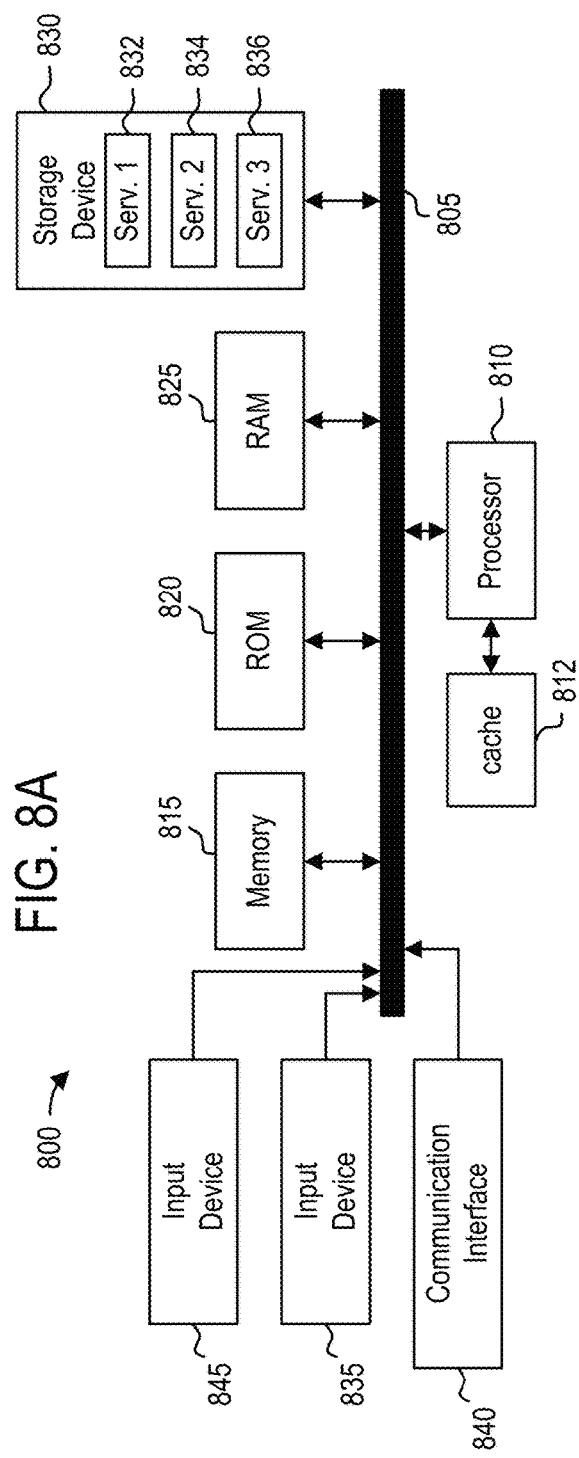
FIG. 8A is a block diagram illustrating a computing device, according to example embodiments.

FIG. 8A illustrates a system bus computing system architecture 800 (hereinafter "system 800"), according to example embodiments. System 800 may be representative of at least a portion of organization computing system 104. One or more components of system 800 may be in electrical communication with each other using a bus 805. System 800 may include a processing unit (CPU or processor) 810 and a system bus 805 that couples various system components including the system memory 815, such as read only memory (ROM) 820 and random access memory (RAM) 825, to processor 810. System 800 may include a cache of high-speed memory connected directly with, in close proximity to, or integrated as part of processor 810. System 800 may copy data from memory 815 and/or storage device 830 to cache 812 for quick access by processor 810. In this way, cache 812 may provide a performance boost that avoids processor 810 delays while waiting for data. These and other modules may control or be configured to control processor 810 to perform various actions. Other system memory 815 may be available for use as well. Memory 815 may include multiple different types of memory with different performance characteristics. Processor 810 may include any general purpose processor and a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the system 800, an input device 845 may represent any number of input mechanisms, such as a microphone for speech, a touch-sensitive screen for gesture or graphical input, keyboard, mouse, motion input, speech and so forth. An output device 835 may also be one or more of a number of output mechanisms known to those of skill in the art. In some instances, multimodal systems may enable a user to provide multiple types of input to communicate with system 800. Communications interface 840 may generally govern and manage the user input and system output. There is no restriction on operating on any particular hardware arrangement and therefore the basic features here may easily be substituted for improved hardware or firmware arrangements as they are developed.

Storage device 830 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 may include services 832, 834, and 836 for controlling the processor 810. Other hardware or software modules are contemplated. Storage device 830 may be connected to system bus 805. In one aspect, a hardware module that performs a particular function may include the software component stored in a computer-readable medium in connection with the necessary hardware components, such as processor 810, bus 805, display 835, and so forth, to carry out the function.

Figure 8B:
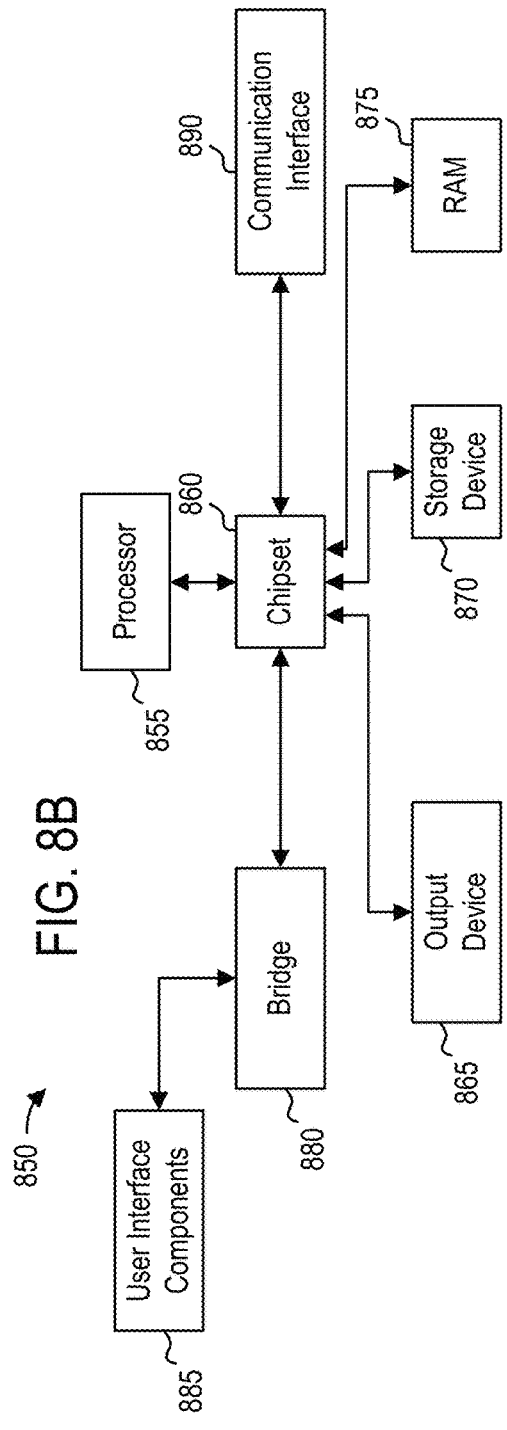
FIG. 8B is a block diagram illustrating a computing device, according to example embodiments.

FIG. 8B illustrates a computer system 850 having a chipset architecture that may represent at least a portion of organization computing system 104. Computer system 850 may be an example of computer hardware, software, and firmware that may be used to implement the disclosed technology. System 850 may include a processor 855, representative of any number of physically and/or logically distinct resources capable of executing software, firmware, and hardware configured to perform identified computations. Processor 855 may communicate with a chipset 860 that may control input to and output from processor 855. In this example, chipset 860 outputs information to output 865, such as a display, and may read and write information to storage device 870, which may include magnetic media, and solid state media, for example. Chipset 860 may also read data from and write data to RAM 875. A bridge 880 for interfacing with a variety of user interface components 885 may be provided for interfacing with chipset 860. Such user interface components 885 may include a keyboard, a microphone, touch detection and processing circuitry, a pointing device, such as a mouse, and so on. In general, inputs to system 850 may come from any of a variety of sources, machine generated and/or human generated.

Chipset 860 may also interface with one or more communication interfaces 890 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 855 analyzing data stored in storage 870 or 875. Further, the machine may receive inputs from a user through user interface components 885 and execute appropriate functions, such as browsing functions by interpreting these inputs using processor 855.

It may be appreciated that example systems 800 and 850 may have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of generating a play prediction for a team, comprising:
   receiving, by a processor of a computing system, match data for a match between a first team and a second team from a memory of the computing system;
   extracting, by the processor of the computing system, from the match data, one or more portions of data corresponding to a target play of the first team of the match, wherein the one or more portions of data include tracking data, and wherein the tracking data includes trajectory data;
   inputting, by the processor of the computing system, the tracking data into a variational autoencoder, wherein the variational autoencoder includes a generative model configured to receive the trajectory data and generate a plurality of variants of target play based on the trajectory data;
   based on the inputting, receiving, by the processor of the computing system, the plurality of variants of the target play based on the tracking data from the variational autoencoder;
   inputting, by the processor of the computing system, the target play and the plurality of variants into a neural network;
   based on the inputting, receiving, by the processor of the computing system, a team identity and a playing style corresponding to each of the plurality of variants from the neural network;
   generating, by the processor of the computing system, a graphical representation of the team identity and the playing style corresponding to each of the plurality of variants; and
   outputting, by the processor of the computing system, the graphical representation via a display of the computing system.

2. The method of claim 1, further comprising:
   associating, by the processor of the computing system, each variant of the plurality of variants with at least one team of the first team or the second team.

3. The method of claim 1, the method further comprising:
   identifying, by the processor of the computing system, a content of the target play.

4. The method of claim 3, wherein inputting, by the processor of the computing system, the tracking data into the variational autoencoder further comprises:
   inputting, by the processor of the computing system, the content of the target play or the playing style into the variational autoencoder.

5. The method of claim 3, wherein each variant of the plurality of variants maintains the content of the target play while changing the playing style exhibited by the target play.

6. The method of claim 1, wherein generating, by the processor of the computing system, the graphical representation of the team identity and the playing style corresponding to each of the plurality of variants comprises:
   generating, by the processor of the computing system, one or more graphical representation trajectories for each of the plurality of variants.

7. The method of claim 1, further comprising:
   predicting, by the processor of the computing system, a likelihood of a third team executing the target play by analyzing the plurality of variants with the neural network to determine a second number of target variants that exhibit a playing style similar to the third team.

8. A method of generating a play prediction for a plurality of teams comprising:
   receiving, by a processor of a computing system, match data for a match between a first team and a second team from a memory of the computing system;
   extracting, by the processor of the computing system, from the match data, one or more portions of data corresponding to a target play of the first team of the match, wherein the one or more portions of data include tracking data, and wherein the tracking data includes trajectory data;

inputting, by the processor of the computing system, the tracking data into a variational autoencoder, wherein the variational autoencoder includes a generative model configured to receive the trajectory data and generate a plurality of variants of target play based on the trajectory data;

based on the inputting, receiving, by the processor of the computing system, the plurality of variants of the target play based on the tracking data from the variational autoencoder;

inputting, by the processor of the computing system, the target play and the plurality of variants into a neural network;

based on the inputting, receiving, by the processor of the computing system, a team identity for a plurality of teams and a playing style corresponding to each of the plurality of variants from the neural network;

predicting, by the processor of the computing system, a likelihood of the second team executing the target play by:

mapping, by the neural network, each variant of the plurality of variants to a team of the plurality of teams based on the playing style exhibited in each variant, determining a number of target variants corresponding to the playing style of each team of the plurality of teams, and identifying the number of target variants corresponding to the playing style of the second team;

generating, by the processor of the computing system, a graphical representation of the number of target variants that exhibit the playing style similar to the second team; and outputting, by the processor of the computing system, the graphical representation via a display of the computing system.

9. The method of claim 8, further comprising:

associating, by the processor of the computing system, each variant of the plurality of variants with at least one team of the first team or the second team.

10. The method of claim 8, the method further comprising:

identifying, by the processor of the computing system, a content of the target play.

11. The method of claim 10, wherein inputting, by the processor of the computing system, the tracking data into the variational autoencoder further comprises:

inputting, by the processor of the computing system, the content of the target play or the playing style into the variational autoencoder.

12. The method of claim 10, wherein each variant of the plurality of variants maintains the content of the target play while changing the playing style exhibited by the target play.

13. The method of claim 8, wherein generating, by the processor of the computing system, the graphical representation of the team identity and the playing style corresponding to each of the plurality of variants comprises:

generating, by the processor of the computing system, one or more graphical representation trajectories for each of the plurality of variants.

14. The method of claim 8, further comprising:

predicting, by the processor of the computing system, a likelihood of a third team executing the target play by analyzing the plurality of variants with the neural network to determine a second number of target variants that exhibit a playing style similar to the third team.

15. A system comprising:

a processor; and a memory having programming instructions stored thereon, which, when executed by the processor, causes the system to perform operations comprising:

receiving, by the processor, match data for a match between a first team and a second team from the memory;

extracting, by the processor, from the match data, one or more portions of data corresponding to a target play of the first team of the match, wherein the one or more portions of data include tracking data, and wherein the tracking data includes trajectory data;

inputting, by the processor, the tracking data into a variational autoencoder, wherein the variational autoencoder includes a generative model configured to receive the trajectory data and generate a plurality of variants of target play based on the trajectory data;

based on the inputting, receiving, by the processor, the plurality of variants of the target play based on the tracking data from the variational autoencoder;

inputting, by the processor, the target play and the plurality of variants into a neural network;

based on the inputting, receiving, by the processor, a team identity and a playing style corresponding to each of the plurality of variants from the neural network;

generating, by the processor, a graphical representation of the team identity and the playing style corresponding to each of the plurality of variants; and outputting, by the processor, the graphical representation via a display of the system.

16. The system of claim 15, further comprising:

associating, by the processor, each variant of the plurality of variants with at least one team of the first team or the second team.

17. The system of claim 15, further comprising:

identifying, by the processor, a content of the target play.

18. The system of claim 17, wherein inputting, by the processor, the tracking data into the variational autoencoder further comprises:

inputting, by the processor, the content of the target play or the playing style into the variational autoencoder.

19. The system of claim 17, wherein each variant of the plurality of variants maintains the content of the target play while changing the playing style exhibited by the target play.

20. The system of claim 15, wherein generating, by the processor, the graphical representation of the team identity and the playing style corresponding to each of the plurality of variants comprises:

generating, by the processor, one or more graphical representation trajectories for each of the plurality of variants.

* * * * *